US009491418B2

(12) United States Patent
Iversen et al.

(10) Patent No.: US 9,491,418 B2
(45) Date of Patent: Nov. 8, 2016

(54) METHOD OF PROVIDING A DIGITALLY REPRESENTED VISUAL INSTRUCTION FROM A SPECIALIST TO A USER IN NEED OF SAID VISUAL INSTRUCTION, AND A SYSTEM THEREFOR

(71) Applicant: Steen Svendstorp Iversen, Lyngby (DK)

(72) Inventors: Steen Svendstorp Iversen, Lyngby (DK); Niels Thomas Rued Jorgensen, Copenhagen (DK)

(73) Assignee: Steen Svendstorp Iversen, Lyngby (DK)

( * ) Notice: Subject to any disclaimer, the term of this patent is extended or adjusted under 35 U.S.C. 154(b) by 0 days.

(21) Appl. No.: 14/443,155

(22) PCT Filed: Nov. 15, 2013

(86) PCT No.: PCT/EP2013/073944
§ 371 (c)(1),
(2) Date: May 15, 2015

(87) PCT Pub. No.: WO2014/076236
PCT Pub. Date: May 22, 2014

(65) Prior Publication Data
US 2015/0288933 A1    Oct. 8, 2015

(30) Foreign Application Priority Data

Nov. 15, 2012   (EP) ..................................... 12192757
Feb. 8, 2013    (EP) ..................................... 13154624

(51) Int. Cl.
*H04N 7/14*   (2006.01)
*H04N 7/18*   (2006.01)
(Continued)

(52) U.S. Cl.
CPC .............. *H04N 7/185* (2013.01); *G06F 1/163* (2013.01); *G06F 1/1686* (2013.01); *G06F 3/011* (2013.01); *G06F 3/147* (2013.01); *G06T 7/0081* (2013.01); *G06T 7/0097* (2013.01); *H04N 7/141* (2013.01); *G06F 3/1454* (2013.01); *G06T 2207/10016* (2013.01); *G06T 2207/20144* (2013.01); *G09G 2340/12* (2013.01); *H04M 1/72544* (2013.01)

(58) Field of Classification Search
None
See application file for complete search history.

(56) References Cited

U.S. PATENT DOCUMENTS

| 6,611,242 B1 | 8/2003 | Hongo et al. |
| 2002/0140667 A1 | 10/2002 | Horiki |

(Continued)

FOREIGN PATENT DOCUMENTS

| JP | 2004056405 | 2/2004 |
| JP | 2004056405 A * | 2/2004 |

(Continued)

OTHER PUBLICATIONS

International Search Report on corresponding PCT application (PCT/EP2013/073944) from International Searching Authority (EPO) dated Mar. 27, 2014.

(Continued)

*Primary Examiner* — Stella L Woo
(74) *Attorney, Agent, or Firm* — Klein, O'Neill & Singh, LLP

(57) ABSTRACT

The present invention provides a method of providing a digitally represented visual instruction from a specialist (2) operating a visual instruction device (4) to a user (6) in need of the visual instruction in relation to an object of interest (8) and a system therefore. In the method a first video stream comprising images of the object of interest is recorded by a first mobile device (12) associated with the user. The first video stream is sent (22) to a second mobile device (18) associated with the specialist. A second video stream comprising the visual instruction device is recorded by the second mobile device and a foreground/background segmentation operation and a background replacement operation is performed on the second and first video stream to provide a third video stream comprising images of the visual instruction device with the first video stream as background. The third video stream is sent (28) to the first mobile device and is displayed essentially simultaneously on first and second displays on both mobile devices allowing the user, by viewing the first display, to be instructed by the specialist and the specialist, by viewing the second display, to operate the visual instruction device properly in relation to the object of interest. An alternative method using a projection device in the first mobile device and systems corresponding to the methods are also provided.

17 Claims, 18 Drawing Sheets

(51) Int. Cl.
*G06F 3/147* (2006.01)
*G06T 7/00* (2006.01)
*G06F 1/16* (2006.01)
*G06F 3/01* (2006.01)
*G06F 3/14* (2006.01)
*H04M 1/725* (2006.01)

(56) References Cited

U.S. PATENT DOCUMENTS

2009/0254855 A1  10/2009  Kretz et al.
2010/0295921 A1* 11/2010  Guthrie ............... G06F 3/011
                                              348/14.08

2013/0083063 A1  4/2013  Geisner et al.

FOREIGN PATENT DOCUMENTS

| WO | WO 03/003185 | 1/2003 |
| WO | WO2009/128781 | 10/2009 |
| WO | WO2010/108186 | 9/2010 |

OTHER PUBLICATIONS

Chien et al.; "Efficient Moving Object Segmentation Algorithm Using Background Registration Technique"; IEEE Transactions on Circuits and Systems for Video Technology; IEEE Service Center, Piscataway, NJ, US; vol. 12, No. 7; Jul. 1, 2002; XP011071848.

* cited by examiner

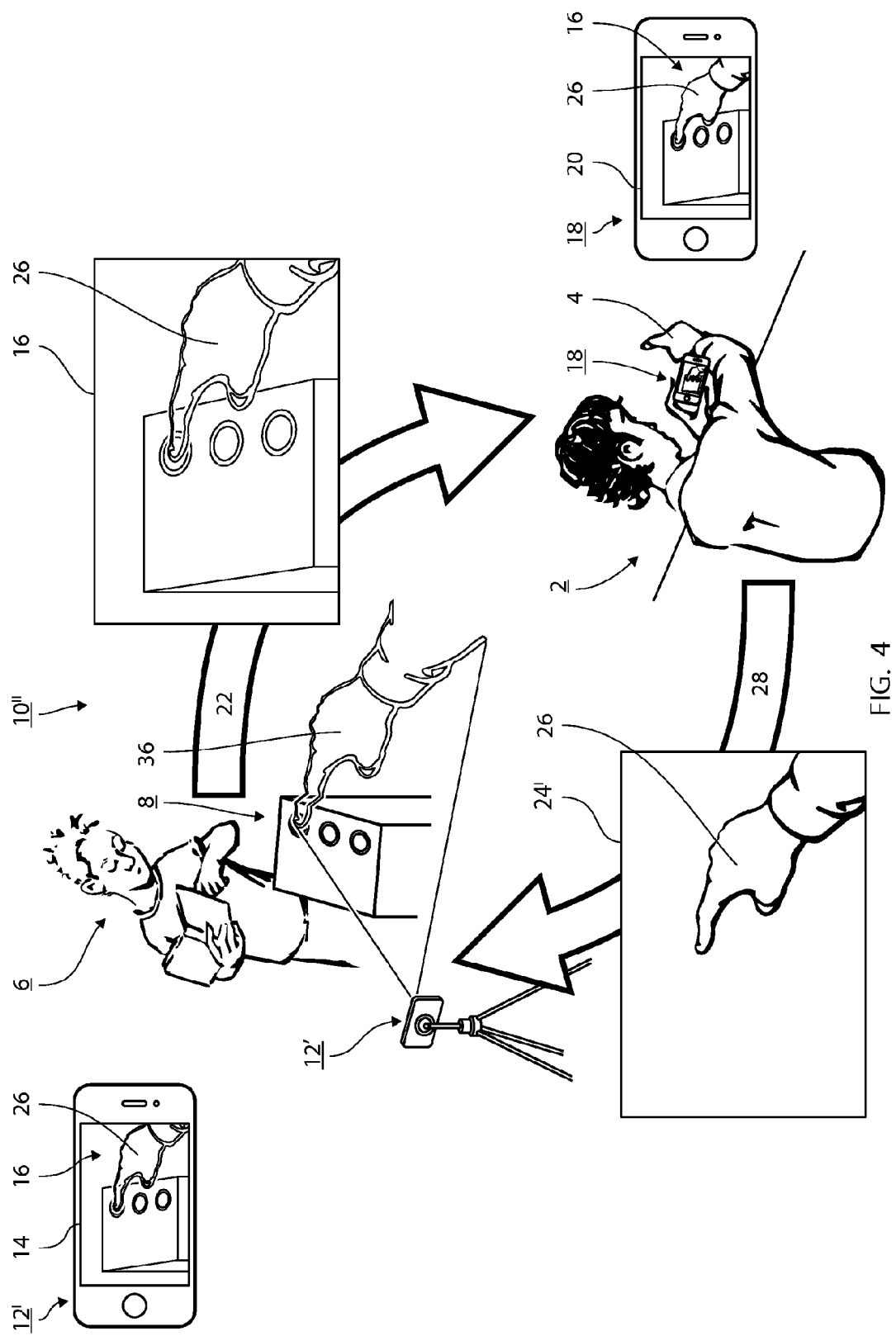

… (1)

METHOD OF PROVIDING A DIGITALLY REPRESENTED VISUAL INSTRUCTION FROM A SPECIALIST TO A USER IN NEED OF SAID VISUAL INSTRUCTION, AND A SYSTEM THEREFOR

CROSS-REFERENCE TO RELATED APPLICATIONS

This application is the national phase entry, under 35 U.S.C. Section 371(c), of International Application No. PCT/EP2013/073944, filed Nov. 15, 2013, claiming priority from European Application Nos. 12192757.8, filed Nov. 15, 2012 and 13154624.4, filed Feb. 8, 2013. The disclosures of the International Application and the European Applications from which this application claims priority are incorporated herein by reference in their entireties.

FEDERALLY SPONSORED RESEARCH OR DEVELOPMENT

Not Applicable

BACKGROUND

The present invention concerns a method of providing a digitally represented visual instruction from a specialist to a user in need of said visual instruction, and a system therefore. More particularly, the present invention concerns a method of providing a digitally represented visual instruction from a specialist, operating a visual instruction device, to a user in need of said visual instruction in relation to an object of interest and a system therefore. In the method a first video stream comprising images of the object of interest is recorded by a first mobile device associated with the user. The first video stream is sent to a second mobile device associated with the specialist. A second video stream comprising the visual instruction device is recorded by the second mobile device and a foreground/background segmentation operation and a background replacement operation is performed on the second and first video stream to provide a third video stream comprising images of the visual instruction device with the first video stream as background. The third video stream is sent to the first mobile device and is displayed essentially simultaneously on first and second displays on both mobile devices allowing the user, by viewing the first display to be instructed by the specialist, and the specialist, by viewing the second display, to operate the visual instruction device properly in relation to the object of interest.

Methods and systems for providing visual instructions, also known as video collaboration tools or remote specialist assistance systems allow a user such as a service employee, for example a technician or a nurse, to obtain remote specialist assistance by pointing a smartphone towards an object of interest and establishing a video and audio session with a remotely located specialist, so the specialist can see transmitted video of the object of interest and deliver voice instructions to the employee or discuss the object of interest. One example of a video collaboration or remote assistance tool is disclosed in WO2010108186, according to which a user uses a mobile phone to obtain image data of an object of interest and a remote assistant, using a remote computer, transmits instructions to the mobile phone for assisting the user. The instructions may include a star-shaped cursor, visually pointing to specific features on the object of interest, overlaid upon the image data obtained by the mobile phone and displayed on the mobile phone's display.

However, a cursor is originally designed for a man-machine interface and is an unnatural interface between two people. This makes collaboration less intuitive and more restricted than the ideal situation where the specialist would be physically present standing next to the user so they could both point, gesture and illustrate using their hands, like for example when an experienced medical doctor illustrates palpation manoeuvres to a less experienced colleague.

Further, it is desirable that a remote collaboration session can be established via a mobile device such as a smartphone also at the end of the specialist, so he can be accessed anywhere using familiar technology with no training required and without having to move to a desktop computer or other equipment. Specialists are usually a limited resource and the overhead time involved for them to provide assistance should be minimized.

Other methods and systems for providing remote assistance are disclosed in inter alia U.S. Pat. No. 6,611,242B1 and WO2009128781A1, in which a worker wearing a head mounted camera is instructed by a marker positioned by an instructor, the instructor viewing the image from the camera and the marker being overlaid on the image from the camera and displayed on a head mounted display.

Thus, also the user, and not only the specialist, may be forced in the prior art solutions to use specialized devices.

Some systems perform a keying of the expert's pointing hand into the picture. This eliminates the need for a cursor and a pointing device, like for example an external mouse or a touch screen, the latter having the problem, that it needs to be quite big to avoid that the expert's finger occludes the area of interest when pointing to it. Further, it allows, in addition to simple pointing, instructional gestures to be performed, it is very intuitive and it conveys a feeling of the expert being present.

In many situations, it would be desirable to have a hand keying remote assistance system in the form of an app, i.e. application for a mobile phone or smartphone, which could work on hand held mobile phones without the need for additional accessories.

This would enable instant help from any specialist anywhere, as long as he is carrying his ever-present mobile phone, even if he may be travelling or on-site somewhere else.

Existing hand keying remote assistance systems are designed to work in controlled environments, and require special accessories like a camera mount, a uniformly colored background plate, special gloves or a tracking device etc. Therefore, these systems are not suited for use with hand held mobile phones in the field, where it may unpractical to bring such accessories.

Hence, the unnatural and restricting interface, the overhead time involved and the lack of mobility for the specialists and in some cases the need for specialised devices for the users in the methods and systems of the prior art, are obstacles for wider adoption of remote specialist assistance systems.

SUMMARY

It is therefore an object of the present invention to provide a method of providing a digitally represented visual instruction from a specialist to a user in need of said visual instruction, and a system therefore which supports a natural way for the user and the specialist to gesture, discuss, demonstrate maneuvers and point to features of an object of interest.

It is a further object of the present invention to provide a method of providing a digitally represented visual instruction from a specialist to a user in need of said visual instruction and a system therefore which is intuitive to use for the specialist.

It is yet a further object of the present invention to provide a method of providing a digitally represented visual instruction from a specialist to a user in need of said visual instruction, and a system therefore which works with commercially available mobile devices, such as smartphones, in both ends, i.e. associated with the specialist and the user, of the session without need for any additional equipment.

At least one of the above objects and/or other objects which will be evident from the below description, are according to corresponding first and third aspects of the present invention achieved by a method of providing a digitally represented visual instruction from a specialist, operating a visual instruction device to a user in need of the visual instruction in relation to an object of interest, the method comprising the steps of:

i. providing a first mobile device associated with the user, the first mobile device comprising:
a. a first camera,
ii. providing a second mobile device associated with the specialist, the second mobile device comprising:
b. a second camera,
c. a second display,
iii. positioning the first mobile device such that the first camera is directed towards a first scene comprising the object of interest,
iv. capturing a first video stream of the first scene by the first camera,
v. positioning the second mobile device such that the second camera is directed towards a second scene comprising the visual instruction device and such that said second display is viewable by the specialist,
vi. capturing a second video stream of said second scene by the second camera, said second video stream comprising a digital representation of the visual instruction device, the digital representation of the visual instruction device defining the digitally represented visual instruction.
vii. generating a third video stream comprising the digitally represented visual instruction in the foreground and the first video stream in the background,
viii. displaying the third video stream on the second display such that the specialist may view the third video stream, and in response to the third video stream, and in order to generate the digitally represented visual instruction, operate the visual instruction device in relation to the object of interest.
ix. sending the digitally represented visual instruction to the first mobile device and receiving the digitally represented visual instruction by the first mobile device, and,
x. displaying the digitally represented visual instruction to the user, and,
a system for providing a digitally represented visual instruction, from a specialist operating a visual instruction device to a user in need of the visual instruction in relation to an object of interest, the system comprising:

a first mobile device comprising a first camera,
a second mobile device comprising a second camera and a second display,
the first camera being configured to capture a first video stream of a first scene comprising the object of interest,
the second camera and the second display being provided on the second mobile device such that second camera can be directed towards a second scene comprising the visual instruction device while the second display is viewable by the specialist,
the second camera being further configured to capture a second video stream of the second scene, the second video stream comprising a digital representation of the visual instruction device, the digital representation of the visual instruction device defining the digitally represented visual instruction,
the second mobile being configured to generate a third video stream comprising the digitally represented visual instruction in the foreground and the first video stream in the background, and
the second mobile device being configured to display the third video stream on the second display so that the specialist may view the third video stream, and in response to the third video stream, and in order to generate the digitally represented visual instruction, operate the visual instruction device in relation to the object of interest.
the second mobile device further being configured to provide the digitally represented visual instruction to the first mobile device, and
the first mobile device being configured to display the digitally represented visual instruction to the user, respectively.

As the specialist sees the third video stream, which comprises the first video stream, the specialist receives the same visual information as the user sees, hence it provides a natural way for the user and the specialist to gesture, discuss, demonstrate maneuvers and point to features of an object of interest.

As the second mobile device is placed such that the second camera can capture the second scene and such that the second display is viewable by the specialist, and as the third video stream is displayed on the second display, the operation of the visual instruction device becomes intuitive for the specialist.

By using a camera and a display which nearly all commercially available mobile devices such as smartphones and tablets are equipped with, there is no need for either the user or the specialist to use any special equipment and hence the specialist is free to offer assistance from nearly every location and the user is able to obtain assistance from nearly every location.

Further, by comprising in a mobile device, such as a mobile phone, a realtime foreground/background segmentation algorithm which separates the visual instruction device, for example the specialist's hand, from the background and creates a mask for keying it into the received first video stream, a visual instruction device, or hand, keying remote assistance system and method can be implemented as an app for mobile phones which has no need for additional hardware or accessories, and which can be used anywhere on the go, in the field or on site.

The steps may be performed consecutively from step i to x. Steps i-iii and v should be performed prior to steps iv and vi.

The digitally represented visual instruction is a digital representation, typically an image, of a visual instruction, typically a position, shape, color or movement, generated by the position, shape, color or movement of the visual instruction device.

In the context of the present invention, the term associated with is to be understood as also comprising the situation, where the item referred to is owned, borrowed, or otherwise in control of, or available to the entity referred to.

The first and second mobile devices are preferably mobile smartphones, such as programmable mobile phones for example an iPhone® or an Android™ mobile phone, a tablet PC such as an iPad® or an Android™ tablet PC, but may also be non-smart mobile phones provided they are equipped with the requisite hardware for performing the required steps of the method.

Further examples of first and mobile devices include glasses or goggles.

The second display should be capable of rendering the third video stream.

The first scene may comprise more than the object of interest, or alternatively the first scene may contain only the object of interest.

The second scene preferably comprises more than the visual instruction device, for example a background surrounding the visual instruction device such that the visual instruction device may be moved in all directions while remaining within the second scene.

In the context of the present invention, the meaning of the digitally represented visual instruction being in the foreground is to be understood as an image of the visual instruction device, i.e. the digitally represented visual instruction, being placed in the foreground, i.e. obscuring the background behind it.

The specialist may operate the visual instruction device for example by moving it, rotating it and changing its shape.

Preferably, the first, second and third video streams have the same resolution, i.e. width and height in pixels. However, where the resolution of the first and second video stream differ one of them may be upsampled or downsampled prior to the generation of the third video stream. The third video steam may also be up or downsampled in relation to the first and second video streams.

In the preferred embodiment of the method and system according to the first aspect of the present invention, the method further comprises the steps of:

xi. sending the first video stream to the second mobile device and receiving the first video stream by the second mobile device, and xii. generating the third video stream by the second mobile device.

In the preferred embodiment of the system according to the third aspect of the present invention, the first mobile device is configured to send the first video stream to the second mobile device, and the second mobile device is configured to receive the first video stream and to generate the third video stream.

This is advantageous in that it provides a system which does not need any central processing infrastructure.

The third video stream may be generated by a second image processing circuit comprised by the second mobile device.

The steps are preferably executed consecutively from step xi to xii.

In an alternative embodiment of the method according to the first aspect of the present invention, the method further comprises the steps of xiii. providing a server capable of generating the third video stream, xiv. sending the first video stream and the digitally represented visual instruction to the server and receiving the first video stream and the digitally represented visual instruction by the server, xv. generating the third video stream by the server, and xvi. sending the third video stream to the second mobile device and receiving the third video steam by the second mobile device.

In an alternative embodiment of the system according to the third aspect of the present invention, the system further comprises a server capable of generating the third video stream and the first mobile device is configured to send the first video stream to the server and the second mobile device is configured to send the digitally represented visual instruction to the server and to receive the third video stream from the server, and the server is configured to receive the first video stream and the digitally represented visual instruction and to generate the third video stream and send it to the second mobile device.

This is advantageous as it decreases the computation power needed in the second mobile device, and thereby allows the method to be performed with a wider variety of second mobile devices.

The steps may be performed consecutively from step xiii to xvi. Step xiii should be performed prior to the steps xiv to xvi.

The server may be a single computer or processor or several computers or processors.

The first video stream and the digitally represented visual instruction may be sent to the server, and the third video stream sent from the server, via telephone lines, a cellular network, or via internet networks and protocols.

The first video stream may be captured to a buffer memory provided in the first mobile device, or alternatively each frame of the first video stream may be sequentially sent to the second mobile device in the preferred embodiment, or the server in the above described alternative embodiment.

The second video stream may be captured to a buffer memory provided in the second mobile device, or alternatively each frame of the second video stream may be sequentially used for generating the third video stream in the preferred embodiment, or may be sent to the server in the above described alternative embodiment.

In the preferred embodiment of the method according to the first aspect of the present invention, the first mobile device further comprises:

d. a first display, and the positioning of the first mobile device is further such that the first display is viewable by the user, and the digitally represented visual instruction is displayed on the first display.

In the preferred embodiment of the system according to the third aspect of the present invention, the first mobile device comprises a first display configured to display the digitally represented visual instruction.

This is advantageous as a display is a simple and compact means of displaying the digitally represented visual instruction and it allows the method to be used with a wide variety of first mobile devices since displays are common on mobile devices.

In the preferred embodiment of the method and system according to the corresponding first and third aspects of the present invention, the first camera and the first display are provided on opposite sides of the first mobile device.

This is advantageous, as it allows the user to place the first mobile device between the user and the object of interest, thus it is easy to position the first mobile device such that the camera is directed towards the object of interest.

In the preferred embodiment of the method according to the first aspect of the present invention, the method further comprises the step of:

xvii. positioning the first mobile device such that the first display is provided on a visual axis between the object of interest and an eye of the user, or alternatively positioning the first mobile device such that the first camera and the first display are provided on a visual axis between the object of interest and the eyes of the user.

This is advantageous as it makes it easier to see the position of the visual instruction device in relation to the object of interest.

In the context of the present invention, the term visual axis is to be understood as comprising a straight line.

In the preferred embodiment of the method according to the first aspect of the present invention, the method further comprises the steps of:

xviii. sending the third video stream to the first mobile device and receiving the third video stream by the first mobile device, and, xix. displaying the third video stream on the first display.

In the preferred embodiment of the system according to the third aspect of the present invention, the second mobile device is configured to send the third video stream to the first mobile device and the first mobile device is configured to receive the third video stream and display it on the first display.

This is advantageous as it decreases the computational power required of the first mobile device in that the first mobile device need only be capable of receiving and displaying the third video stream. Further, it ensures that both the specialist and the user sees the same visual information, thus it makes the cooperation between the specialist and the user more effective.

Where the third video stream is generated by a server, a further advantage arises in that it lessens the risk of a delay between the display of a certain frame of the third video stream on the first mobile device and the second mobile device, since both mobile devices need to send their respective video streams to the server and receive the third video stream from the server, thus the amount of data transmitted to and from the server and the requirements for computational power are similar for both mobile devices.

The steps may be performed consecutively from step xviii to xix. Step xviii should be performed prior to step xix.

In an alternative embodiment of the method according to the first aspect of the present invention, the method further comprises the steps of:

xx. generating a fourth video stream comprising the digitally represented visual instruction in the foreground and the first video stream in the background by the first mobile device, and, xxi. displaying the fourth video stream on the first display.

In an alternative embodiment of the system according to the third aspect of the present invention, the first mobile device is configured to generate a fourth video stream comprising the digitally represented visual instruction in the foreground and the first video stream in the background and to display the fourth video stream on the first display.

This is advantageous in that it requires less bandwidth between the first mobile device and the second mobile device, since only the digitally represented visual instruction and not the full third video stream need to be sent to the first mobile device.

The fourth video stream is generated in the same way as and is preferably identical to the third video stream.

The steps may be performed consecutively from step xx to xxi. Step xx should be performed prior to step xxi.

In alternative embodiments of the method and system according to the corresponding first and third aspects of the present invention, the first display is optically transparent and the digitally represented visual instruction is displayed on a part of the first display, such that the user may see the digitally represented visual instruction on the part of the first display and the object of interest optically through the first display, simultaneously.

This is advantageous as it allows the user to see the object of interest in the background in great detail and clarity through the display, while seeing the visual instruction on the first display, potentially eliminating the need for the user of taking his eyes off the first display to look directly at the object of interest.

The first display may be a transparent LCD display.

The object of interest is seen through the remainder of the first display, i.e. the whole of the first display minus the part on which the digitally represented visual instruction is displayed, and minus any further part on which other information or controls to of use to the user are displayed, for example a current time, date, volume control, brightness control.

In a first method of displaying the digitally represented visual instruction on a part of the first display, the second video stream or the third video stream is first sent from the second mobile device to the first mobile device. Then a fourth video stream or a modified third video stream, comprising the digitally represented visual instruction in the foreground and with a background having pixel values which results in the background being transparent when displayed on the first display, is generated by the first mobile device by a foreground/background segmentation and background replacement on the second or third video stream as described below with reference to method steps xxv and xxvi and the discussion thereof. Finally, the fourth video stream or the modified third video stream is displayed on the first display.

This is a robust method which tolerates differences in resolution and quality between the first camera and the second camera.

In a second method of displaying the digitally represented visual instruction on a part of the first display, the third video stream is sent to the first mobile device by the server or by the second mobile device. The first mobile device then generates a fourth video stream by subtracting the first video stream from the third video stream, such that all pixels having the same pixel values in both the first and third video stream are set to pixel values which yield transparent pixels when displayed on the first display.

The subtraction is made for each pair of temporally corresponding video images in the third and first video streams.

This is a method which is fast since there is no need for foreground/background segmentation.

In an alternative embodiment of the method according to the first aspect of the present invention, the first mobile device further comprises:

e. a first projection device, and the method further comprises the steps of:

xxii. projecting the digitally represented visual instruction onto the object of interest.

In an alternative embodiment of the system according to the third aspect of the present invention, the first mobile device further comprises a projection device configured to project the digitally represented visual instruction onto the object of interest.

This is advantageous as it provides a way of displaying the digitally represented visual instruction to the user, which does not require the user to watch the first mobile device.

In the preferred embodiment of the method and system according to the corresponding first and third aspects of the present invention, the visual instruction device comprises the hand of the specialist and/or an object held by the hand.

This is advantageous as it allows the specialist to convey more information in the digitally represented visual instruction, for example the shape or orientation of the hand, gestures of the hand, the type of object, the orientation of the object, the handling of the object, etc., than that which can be conveyed by for example a cursor.

The object may be a tool such as a screwdriver, a probe, a scalpel, or alternatively the object may be an electronic component, a spare part, etc.

In the preferred embodiment of the method and system according to the corresponding first and third aspects of the present invention, the second camera and the second display are provided on opposite sides of the second mobile device.

This is advantageous as it allows the specialist to place the second mobile device between the visual instruction device and himself, thus it is easy and intuitive to position the visual instruction device in relation to the object of interest shown in the third video stream displayed on the second display.

In the preferred embodiment of the method according to the first aspect of the present invention, the method further comprises the step of:

xxiii. positioning the second mobile device such that the second display is provided on a visual axis between the visual instruction device and an eye of the specialist, or alternatively positioning the second mobile device such that the second camera and the second display are provided on a visual axis between the visual instruction device and the eyes of the specialist.

This is advantageous as it makes it easier and more intuitive to see and control the position of the visual instruction device in relation to the object of interest shown in the third video stream displayed on the second display.

In one embodiment of the method and system according to the corresponding first and third aspects of the present invention, the first mobile device is a first headgear device, preferably a helmet or goggles, the first headgear device is affixable to the head of the user, and it is adapted to position the first display such that it is viewable by the user when the first headgear device is affixed to the head of the user.

This is advantageous as it allows the user to use both his arms and hand to interact with the object of interest. Further, it relieves the user of having to hold the first mobile device.

The first headgear device may be a helmet, for example a hard hat, goggles, glasses, etc. The first display may be held by an arm so that the first display is viewable by the user. The first camera may be attached to the arm or attached to the helmet. A computing module, a transceiver module, and a power supply may be integrated with the helmet, the first display, the arm or the first camera, or may be distributed between these four elements.

On goggles or glasses the first display may substitute one of the lenses and be positioned such that it is mainly viewable by a first eye of the user. A further first display comprised by the first mobile device and operably connected to a further first camera in the same way as the first display is operably connected to the first camera, may substitute the other one of the lenses and be positioned such that it is mainly viewable by a second eye of the user for stereoscopic vision in combination with he first display and the first camera.

Alternatively, the further first display may mirror the first display.

When the first headgear is goggles or glasses, the first display and the further first display where present, are preferably transparent.

The first display and where present the further first display, may cover fully or partially the field of view of the user.

A computing module, a transceiver module, and a power supply may be integrated with the goggles or glasses, the first display, or the first camera, or may be distributed between these three elements.

In one embodiment of the method and system according to the corresponding first and third aspects of the present invention, the second mobile device is a second headgear device, preferably a helmet or goggles, the second headgear device is affixable to the head of the specialist and it is adapted to position the second display such that it is viewable by the specialist when the second headgear device is affixed to the head of the specialist.

This is advantageous as it allows the specialist to use both his arms and hands to control the visual instruction device. Further, it relieves the specialist of having to hold the first mobile device.

The second headgear device may be a helmet, for example a hard hat, goggles, glasses, etc. The second display may be held by an arm so that the second display is viewable by the specialist. The second camera may be attached to the arm or attached to the helmet. A computing module, a transceiver module and a power supply may be integrated with the helmet, the second display, the arm or the second camera, or may be distributed between these four elements.

On goggles or glasses, the second display may substitute one of the lenses and be positioned such that it is mainly viewable by a first eye of the specialist. A further second display comprised by the second mobile device and operably connected to a further second camera in the same way as the second display is operably connected to the second camera, may substitute the other one of the lenses and be positioned such that it is mainly viewable by a second eye of the specialist, for stereoscopic vision in combination with the second display and the second camera.

Alternatively, the further second display may mirror the second display.

The second display and where present the further second display, may cover fully or partially the field of view of the specialist.

A computing module, a transceiver module, and a power supply may be integrated with the goggles or glasses, the second display, or the second camera, or may be distributed between these three elements.

In an alternative embodiment of the method according to the first aspect of the present invention, the method further comprises the steps of:

xxiv. providing a first headgear holding device, preferable a helmet, headband or goggles, affixable to the head of the user, comprising a first holding device, for holding the first mobile device, and a first positioning device interposed between the first headgear holding device and the first holding device, the first positioning device being adapted to position the first mobile device such that the first display is viewable by the user when the first headgear holding device is affixed to the head of the user, and xxv. affixing the first headgear holding device to the head of the user and attaching the first mobile device to the first holding device, or alternatively or additionally the steps of:

xxvi. providing a second headgear holding device, preferable a helmet, headband or goggles, affixable to the head of the specialist, comprising a second holding device for holding the second mobile device, and a second positioning device interposed between the second headgear holding device and the second holding device, the second positioning device being adapted to position the second mobile device such that the second display is viewable by the specialist when the second headgear holding device is affixed to the head of the specialist, and xxvii. affixing the second headgear holding device to the head of the specialist and attaching the second mobile device to the second holding device.

In an alternative embodiment of the system according to the third aspect of the present invention, the system further comprises a first headgear holding device, preferably a helmet, headband or goggles, affixable to the head of the user, the first headgear holding device comprising a first holding device for holding the first mobile device, and a first positioning device interposed between the first headgear holding device and the first holding device, the first positioning device being adapted to position the first mobile device such that the first display is viewable by the user when the first headgear holding device is affixed to the head of the user, or alternatively or additionally the system further comprises a second headgear holding device, preferably a helmet, headband or goggles, affixable to the head of the specialist, the second headgear holding device comprising a second holding device, for holding the second mobile device, and a second positioning device interposed between the second headgear holding device and the second holding device, the second positioning device being adapted to position the second mobile device such that the second display is viewable by the specialist when the second headgear holding device is affixed to the head of the specialist. This is advantageous as it allows the user and/or the specialist to use both arms and hands for interacting with the object of interest and controlling the visual instruction device, respectively.

The first and/or second headgear holding device may be a helmet, for example a hard hat, goggles, glasses, etc. The first and/or second positioning device may be an arm, which arm may be adjustable in length and/or direction. The first and/or second holding device may be a clip, a magnet, a rubber band etc. If the first and/or second positioning device positions the first or second display close to an eye of the user or specialist a concave lens may be provided, for example supported by the first and/or second positioning device or supported by the first and/or second holding device, help the eye to properly focus on the first and/or second display.

The steps may be performed consecutively from step xxiv to xxvii. Steps xxiv and xxvi should be performed prior to steps xxv and xxvii.

In the preferred embodiment of the method according to the first aspect of the present invention, the generation of the third video stream is performed essentially simultaneously with the capturing of the first video stream and the capturing of the second video stream.

In the preferred embodiment of the system according to the third aspect of the present invention, the first and second mobile devices are configured such that the second mobile device generates the third video essentially simultaneously with the capturing of the first video stream and the capturing of the second video stream.

This is advantageous as it preserves the information content of the digitally represented visual instruction.

If the specialist is able to properly control the visual instruction device in relation to the object of interest, then the information content of the digitally represented visual instruction is high. If the specialist is not able to properly control the visual instruction device in relation to the object of interest, then the information content of the digitally represented visual instruction is low or non-existent.

Preferably, the display of the digitally represented visual instruction is also performed essentially simultaneously with the displaying of the third video stream on the second display.

The term "essentially simultaneously" as used in this application including the points is to be understood as also encompassing the situation where there is a delay or lag between the display of a certain frame of the third video stream, on the second mobile device and the display of that certain frame, or the corresponding digitally represented visual instruction to the user, or between the capturing of a certain frame in the first and/or second video stream and the generation of a frame in the third video stream comprising that certain frame, provided the delay is less than or equal to a certain time. If the delay is too large, the specialist will not be able to control the visual instruction device properly as any deliberate or accidental change in position of the first or second mobile device will lead to a change in the position of the visual instruction device in relation to the object of interest, thus destroying or at least decreasing the information content of the digitally represented visual instruction. Further, a large delay will make it hard for the specialist to control the visual instruction device, as he will have to wait after moving the visual instruction device to see its new position in relation to the object of interest.

This delay may for example be caused by the time needed to generate the third video stream and/or the time needed to capture and send the first video stream to the second mobile device. Preferably, this delay should not be more than 20 ms to maintain a good synchronization between the specialist and the user and/or to maintain a high information content of the digitally represented visual instruction. Hence, the delay should not be more than 20 ms.

In embodiments of the method according to the first aspect of the present invention, the second mobile device may further comprise:

f. a light source for illuminating the visual instruction device, in which case the method further comprises the step of:

xxviii. illuminating the visual instruction device by the light source.

In embodiments of the system according to the third aspect of the present invention, the second mobile device may further comprise a light source for illuminating the visual instruction device.

This is advantageous as it provides for simple methods of generating the third video stream.

The light source may for example be a LED or Xenon flash. The light source may be used for illuminating the visual instruction device for performing a luma keying or chroma keying of the second video stream with the first video stream In the preferred embodiment of the method according to the first aspect of the present invention, the method further comprises the steps of:

xxix. performing a foreground/background segmentation on the second video stream by segmenting each video image of the second video stream into a foreground video image and a background video image such that the digitally represented visual instruction is comprised by the foreground video image, and, xxx. performing a background replacement on the second video stream with the first video stream by combining each foreground video image with a temporally corresponding video image from the first video stream.

In the preferred embodiment of the system according to the third aspect of the present invention, the second mobile device is further configured to perform a foreground/background segmentation on the second video stream by segmenting each video image of the second video stream into a foreground video image and a background video image, such that the digitally represented visual instruction is comprised by the foreground video image, and to perform a background replacement on the second video stream with the first video stream by combining each foreground video image with a temporally corresponding video image from the first video stream.

This is advantageous as it provides a simple way of generating the third video stream. The steps may be performed consecutively from step xxix to xxx. Step xxix should be performed prior to step xxx.

The steps xxv and xxvi may in the alternative embodiment of the method according to the first aspect of the present invention be performed by the server and the server may in the alternative embodiment of the system, according to the third aspect of the present invention, be configured to perform the steps xxv and xxvi.

The background/foreground segmentation may comprise a calibration procedure which may be performed at the beginning of a remote assistance session and which may calculate data which may be used by a mask calculation procedure which may be performed essentially every time an image I of the second video stream is recorded by the second camera.

The mask calculation procedure, described in further detail below, may be performed during or before the foreground/background segmentation step and/or during or before the background replacement step. Further, the mask image calculated by the mask calculation procedure may, as described in more detail below, be used in the foreground/background segmentation step and the background replacement step.

The calibration procedure may comprise the recording of a first calibration image before the visual instruction device is introduced in front of the second camera and recording a second calibration image after the visual instruction device is introduced in front of the second camera.

The calibration procedure may be optimized for a configuration where the second mobile device is handheld, for example when it is a mobile telephone, and the calibration procedure may be performed when it is detected that the second mobile device is being held essentially still for a period of time and may further comprise recording a first set of calibration images at essentially regular intervals and may further comprise detecting when the visual instruction device is introduced in front of the second camera and may further comprise selecting from the first set of calibration images the first calibration image and the second calibration image.

The calibration procedure may further comprise an adjustment of at least one exposure parameter of the second camera. The adjustment may be performed after the visual instruction device is introduced in front of the second camera and may reduce or eliminate overexposed areas in areas corresponding to the visual instruction device in the second calibration image. Further, the calibration procedure may perform a color correction of the first calibration image so areas corresponding to the background in the first calibration image essentially appear with the same exposure as areas corresponding to the background in the second calibration image.

Alternatively or additionally, the calibration procedure may comprise selecting from a second set of recorded calibration images the first calibration image so areas in the first calibration image corresponding to the background essentially appear with the same exposure as areas corresponding to the background in the second calibration image. The second set of calibration images may be established by recording at least two images and changing at least one exposure setting of the second camera essentially inbetween every recording.

The calibration procedure may calculate for at least one color a value indicating an estimated probability that a pixel in an image recorded by the second camera of the visual instruction device in front of the background and having the color is located within an area corresponding to the visual instruction device.

The mask calculation procedure may be initiated when the calibration procedure is completed and may comprise calculation of a first mask image M where a pixel value of a pixel may indicate the probability that the pixel is located in an area corresponding to an area corresponding to the visual instruction device in an image I captured by the second camera. For example the brightness of the pixel may indicate the probability.

The mask calculation may further comprise a first thresholding of M with a first threshold value and storing the result in a second mask image Ms. Hence, M may b a binary mask which may be black and white. Additionally, the mask calculation may comprise a second thresholding of M with a second threshold value which may be lower than the first threshold value and storing the result in a third mask image Mr. Hence Mr may be a binary mask which may be black and white. Hence, the second mask image Ms may be a strict mask image, meaning that it may mask areas with a very high probability only and Mr may be a relaxed keying mask image, meaning that it masks areas which have a probability of corresponding to the visual instruction device of for example higher than 50%. Additionally, the mask calculation may comprise a calculation of the first mask image comprising a seed-fill compositing operation of Ms and Mr where the second mask image Ms is used as a seed image and the third mask image Mr is used as a fill image and storing the result in M. A seed-fill operation of a type well known in the art may be comprised. The seed-fill operation may be constrained spatially to a radius from any seed point. Alternatively, a seed-fill type operation comprising a sequence of dilate and multiply operations may be comprised.

Alternatively, the seed-fill type operation may comprise another pixel affinity filter operation well known in the art, for example a gradient filter, and a multiplication of the output of the pixel affinity with the seed image.

The above described foreground/background segmentation and background replacement may be performed in realtime in a mobile phone. This provides a remote assistance system which can be implemented as an app for mobile phones which has no need for additional hardware or accessories, and which can be used anywhere on the go, in the field or on site.

For ease of explanation, the following further description of the calibration procedure uses as an example a configuration optimized for implementation in a typical mobile phone with camera having automatic exposure control, with motion sensors and with hardware accelerated image processing using an RGB color space. However, the scope of the invention is not intended to be limited to this example but is intended to include variations hereof which are obvious to a person of ordinary skills in the art of algorithms for mobile phones, image processing and photography, including but not limited to augmenting or substituting the mobile phone with body worn hardware which may comprise camera and/or display and/or microphone and/or speaker and/or eye wear, substituting automated activation of tasks with manual user activation, substituting concurrently running processes with a similarly functioning sequential process, substituting automated exposure adjustment with manual exposure adjustment and converting the described calculations to other color spaces. The term "color" in the description should be interpreted to mean a set of pixel values having essentially similar hue, saturation and brightness, for example a set of pixel values where the difference between any R, G or B color channel value of any pixel value in the set of pixel values and the corresponding R, G or B color channel value of any other pixel in the set of pixel values is below a given threshold. The terms "every possible color" and "every possible input color" should be interpreted to mean every color within the color gamut of the output of the second camera.

The calibration procedure may establish a first reference image Ref1 of the background without the visual instruction device and further establish a second reference image Ref2 of the visual instruction device in front of the background. The first reference image Ref1 may be a recording by the second camera of the background before the visual instruction device is introduced in front of the second camera or the first reference image Ref1 may be calculated from the second reference image Ref2 by masking out areas in Ref2 corresponding to the visual instruction device.

The calibration procedure may run concurrently with a first parallel process which may capture the first video stream and capture the second video stream and display the third video stream as described above, but where the third video stream may be generated by setting it equal to the first video stream. When the calibration procedure is initiated, it may signal to the first parallel process that calibration is in progress and the first parallel process shall start generating the third video stream by setting it equal to the first video stream. When the calibration procedure is completed, it may signal to the first parallel process that calibration is completed and the first parallel process shall start generating the third video stream as described above so the third video stream now may comprise the digitally represented visual instruction in the foreground and the first video stream in the background. Hence, until the calibration procedure is completed, the user and the specialist may both see the object of interest without the visual instruction device in the foreground and when the calibration procedure is completed, they may both see the object of interest with the visual instruction device in the foreground.

The calibration procedure may be initiated essentially when an embodiment of the present invention is activated. Alternatively, it may be initiated by a user activation, which may comprise detection of the user touching a virtual button on a touch screen. Alternatively or additionally, the user activation may comprise a detection of the user shaking the second mobile device. After the calibration procedure has been initiated, it may be initiated again by the user activation. If the calibration procedure has not been completed before the user activation, the calibration procedure may be stopped before it is initiated again.

Additionally, the second mobile device may comprise a position sensor capable of sensing and outputting a set of sensed position data Psense and the calibration procedure may comprise receiving the set of sensed position data Psense and storing it in a recorded set of position data Prec before the calibration procedure establishes the first reference image Ref1 and the second reference image Ref2. The set of position data may comprise the position and/or vertical angle and/or horizontal angle of the second mobile device and the position sensor may comprise a gyroscope and it may comprise an accelerometer and a calculation of position data based on accumulated accelerations as is well known in the art.

A concurrently running second parallel process may receive the set of sensed position data Psense from the position sensor, compare it to the recorded set of position data Prec and calculate a change severity number Ns which may indicate the severity of the impact which the change in position and/or angle of the second mobile device since the calibration was initiated may have on recorded images by the second camera of the background and of the visual instruction device. The second parallel process may calculate a resulting position distance Pdiff and a resulting angle distance Vdiff between Prec and Psense as is well known in the art of mathematics, and may further calculate a position change severity number Nps and an angle change severity number Nvs, where Nps may be set to 0 if Pdiff is smaller than a first position threshold and Nps may be set to 1 if Pdiff is bigger than the first position threshold and smaller than a second position threshold and Nps may be set to 2 if Pdiff is bigger than the second position threshold and where Vps may be set to 0 if Vdiff is smaller than a first angle threshold and Vps may be set to 1 if Vdiff is bigger than the first angle threshold and smaller than a second angle threshold and Vdiff may be set to 2 if Vdiff is bigger than the second angle threshold and where Ns may be set to the highest of Nps and Nvs. The first position threshold may be 5 cm and the second position threshold may be 1 meter and the first angle threshold may be 2 degrees and the second angle threshold may be 45 degrees.

The second parallel process may calculate the change severity number Ns with regular intervals, for example every time an image of the second video stream is recorded by the second camera, and if the calibration procedure is not completed and Ns is bigger than 0 it may stop the calibration procedure and initiate it again. Additionally, if the calibration procedure is completed and Ns is equal to 2 it may also initiate the calibration procedure again. Hence if the second mobile device is moved just slightly during the calibration procedure, the calibration procedure is stopped and initiated again, ensuring that the calibration procedure is only completed when the second camera has been held fairly steady throughout it, while after the calibration procedure is completed, a bigger change in position of the second camera is needed to initiate the calibration procedure again. The advantage of this is, that while it is necessary to hold the second camera relatively steady between the recording of the first reference image Ref1 and the recording of the second reference image Ref2, as it shall been seen in the following, a much bigger change in position can be tolerated after the calibration procedure has been completed. Hence, since the interval between the recording of the first reference image Ref1 and the recording of the second reference image Ref2 may only be a few seconds, the specialist will overall experience a great deal of tolerance to movement of the second mobile device and will only have to hold it still for a brief moment while the calibration procedure establishes the first reference image Ref1 and the second reference image Ref2.

From the point of view of the specialist, a remote assistance session may be experienced like in the following example, where the second mobile device is his mobile phone and where he wishes to use his hand as the visual instruction device:

- The video call is initiated and he observes the third video stream comprising the object of interest received from the user end.
- He decides he wants to point to a feature and he holds his phone in front of him with one hand, holding it relatively still, then he introduces his other hand in front of the phone's camera.
- After a brief moment he and the user observes his hand in the foreground of the object of interest and he can start pointing and gesturing.
- He no longer needs to hold the phone still, as long as he does not move to a background comprising large areas with colors similar to the colors of his hand or to an environment with completely different lighting.
- If he moves to another environment or if the ambient light changes radically, if for example a lamp is lit, he can press a button or shake the phone and introduce his hand again.

In embodiments of the method according to the first aspect of the present invention, the second mobile device may further comprise:

- g. a light source for illuminating the visual instruction device, and step vii comprises the substeps of:

- h. recording a first frame of the second video stream by the second camera while the light source does not illuminate the visual instruction device,
- j. recording a second frame of the second video stream by the second camera while the light source illuminates the visual instruction device,
- k. generating a differential frame by subtracting the second frame transformed into grayscale from the first frame transformed into grayscale,
- m. optionally generating a filtered differential frame by noise filtering the differential frame, wherein the noise filtering may be median filtering,
- n. generating a foreground mask by threshold filtering the differential frame or the filtered differential frame, and
- o. generating a frame of the third video stream by adding the product of the first frame and the foreground mask to the product of a frame of the first video stream and the inverse of the foreground mask.

In embodiments of the system according to the third aspect of the present invention, the second mobile device may further comprise a light source for illuminating the visual instruction device and the second mobile is further configured to record a first frame of the second video stream using the second camera while the light source does not illuminate the visual instruction device, record a second frame of the second video stream using the second camera stream while the light source illuminates the visual instruction device, and the second mobile device or the server is further configured to generate a differential frame by subtracting the second frame transformed into grayscale from the first frame transformed into grayscale, optionally generate a filtered differential frame by noise filtering the differential frame, wherein the noise filtering may be median filtering, generate a foreground mask by threshold filtering the differential frame or the filtered differential frame, and to generate a frame of the third video stream by adding the product of the first frame and said foreground mask to the product of a frame of the first video stream and the inverse of the foreground mask.

The substeps k, m, n, o are preferably performed consecutively. substeps h and j should be performed prior to substeps k, m, n and o.

This method or steps of foreground/background segmentation and background replacement are advantageous in that they require very little computational power. It is therefore especially suited for when the third video stream is generated by the second mobile device. The transformations and operations are simple matrix operations and do not involve any tracking of feature recognition.

The light source may be a LED or Xenon flash. The light source should be capable of illuminating the visual instruction device. Due to the difference in distance between the visual instruction device and the second camera and the distance between any background in the second scene and the camera, the visual instruction device will be more brightly illuminated than the background of the second scene.

In substep k, intermediate first and second frames may first be generated by transforming the first and second frames into grayscale, whereafter the second intermediate frame is subtracted from the first intermediate frame. Alternatively, the differential frame may be computed directly using the values for the different color channels of the frames and appropriate coefficients for converting to gray scale. One possible example where the first and second frames are RGB coded is Gray=0.299 Red+0.587 Green+0.114 Blue.

The substeps h and j should be performed before the substeps k, m, n, and o. As two frames of the second video stream are needed for producing one frame of the third video stream, the second camera may record the second video stream at double the frame rate of the first video stream used for generating the third video stream. This gives a high quality. Alternatively, the third video stream could be generated in such a way that every second frame of it is generated according to the above method while the frames in between are simply copies of frames from the first video stream. This obviates the need for having different frame rates for the first and second video streams, however it may lead to flickering.

The substeps k, m, n and o may be performed by the second mobile device, the server, or distributed between the second mobile device and the server. It is further contemplated that the substeps k, m, n and o may also be performed by the first mobile device provided that a frame of the fourth video stream is then generated in substep p.

If the environment, in which the second mobile device is situated, is dark, the substeps h and k may be dispensed with. In this case a modified substep m uses the second frame, recorded in substep j, in place of the differential frame for generating a filtered second frame. Further, a modified substep n uses the second frame or the filtered second frame in place of the differential frame or the filtered differential frame for generating the foreground mask. Finally, a modified substep o uses the second frame in place of the first frame for generating the frame of the third video stream.

Correspondingly, the second mobile device or the server is modified to optionally generate a filtered differential frame by noise filtering the second frame, wherein the noise filtering may be median filtering, generate a foreground mask by threshold filtering the second frame or the filtered second frame, and to generate a frame of the third video stream by adding the product of the second frame and said foreground mask to the product of a frame of the first video stream and the inverse of the foreground mask.

This is advantageous as it reduces the need for rapidly turning the light source on and off, further it saves on computational resources as there is no need for generating the differential frame.

The reason for being able to dispense with substeps h and k is that the difference in distance between the visual instruction device and the background, for example the walls of a room in which the specialist stands holding the second mobile, causes the visual instruction device to be much more brightly illuminated by light source than the background. Thus, where the background is dark, for example in an unlit room, the second frame of the second video stream, as recorded in substep j, may be used, directly or after noise filtering, in the threshold filtering.

At least one of the above objects and/or other objects, which will be evident from the below description, are according to corresponding second and fourth aspects of the present invention achieved by a method of providing a digitally represented visual instruction from a specialist, operating a visual instruction device to a user in need of said visual instruction in relation to an object of interest, the method comprising the steps of:

xxxi. providing a first mobile device associated with the user, the first mobile device comprising:
p. a first camera,
xxxii. providing a projection device associated with said user and capable of projecting the digitally represented visual instruction,
xxxiii. providing a second mobile device associated with the specialist, the second mobile device comprising:
q. a second camera,
r. a second display,
xxxiv. positioning the first mobile device such that the first camera is directed towards a first scene comprising the object of interest,
xxxv. positioning the projection device such that the projection device is capable of projecting the digitally represented visual instruction onto the first scene,
xxxvi. positioning the second mobile device such that the second camera is directed towards a second scene comprising the visual instruction device and such that the second display is viewable by the specialist,
xxxvii. capturing a first video stream of the first scene by the first camera,
xxxviii. capturing a second video stream of the second scene by the second camera, the second video stream comprising a digital representation of the visual instruction device, the digital representation of the visual instruction device defining the digitally represented visual instruction,
xxxix. providing a third video stream using the second video stream, the third video stream comprising the digitally represented visual instruction in the foreground on a dark or black background,
xl. sending the third video stream to the projection device and receiving the third video stream by the projecting device,
xli. projecting the third video stream onto the first scene, thereby providing the digitally represented visual instruction to the user and thereby introducing the digitally represented visual instruction into the first scene,
xlii. sending the first video stream to the second mobile device and receiving the first video stream by the second mobile device,
xliii. displaying the first video stream on the second screen such that the specialist may view the first video stream, and in response to the first video stream, and in order to generate the digitally represented visual instruction, operate the visual instruction device in relation to the object of interest, and, a system for providing a digitally represented visual instruction from a specialist operating a visual instruction device to a user in need of the visual instruction in relation to an object of interest, the system comprising:

a first mobile device comprising a first camera,
a projection device,
a second mobile device comprising a second camera and a second display,
the first camera being configured to capture a first video stream of a first scene comprising the object of interest,
the second camera and the second display being provided on the second mobile device such that the second camera can be directed towards a second scene comprising the visual instruction device while the second display is viewable by the specialist,
the second camera being further configured to capture a second video stream of the second scene, the second video stream comprising a digital representation of the visual instruction device, the digital representation of the visual instruction device defining the digitally represented visual instruction,
the second mobile being configured to provide a third video stream, using the second video stream, the third video stream comprising the digitally represented visual instruction in the foreground on a dark or black background,
the second mobile device being configured to send the third video stream to the projector,
the projector being configured to receive the third video stream and to project the third video stream onto the object of interest in order to introduce the digitally represented visual instruction into the first scene, respectively.

As the specialist sees the first video stream, which comprises the images of the object of interest with the digitally represented visual instruction projected onto it, the specialist receives the same visual information as the user, hence it provides a natural way for the user and the specialist to gesture, discuss, demonstrate maneuvers and point to features in an object of interest.

As the second mobile device is placed such that the second camera can capture the second scene and such that the second screen is viewable by the specialist and as the first video stream is displayed on the second screen, the operation of the visual instruction device becomes intuitive for the specialist.

By using a camera and a display, with which nearly all commercially available mobile devices such as smartphones and tablets are equipped with, there is no need for the specialist to use any special equipment, and hence the specialist is free to offer assistance from nearly every remote location.

As the digitally represented visual instruction is projected onto the object of interest, the user is free from having to view a display on the first mobile device, thus the user may for example study a manual associated with the object of interest while receiving the digitally represented visual instruction.

The steps may be performed consecutively from step xxxi to xliii. Steps xxxi-xxxvi should be performed prior to the steps xxxvii and xxxviii.

What has been described above with regard to the digitally represented visual instruction, the first and second mobile devices, the first and second scene, the operation of the visual instruction device and the resolution of the first, second and third video stream in relation to the method and system according to the corresponding first and third aspects of the present invention, applies also to the method and system according to the corresponding second and fourth aspects of the present invention.

Further, the second display should be capable of rendering the first video stream.

In the preferred embodiment of the method and system according to the corresponding second and fourth aspects of the present invention the projection device is comprised by this first mobile device.

This is advantageous in that it removes the need for a separate projector.

In the preferred embodiment of the method and system according to the second aspect of the present invention, the method further comprises the steps of:

xliv. analyzing the second video stream for determining whether:
s. the second video stream comprises the digitally represented visual instruction on a uniform dark or black background, in which case the providing of the third video stream comprises copying the second video stream, or
t. the second video stream does not comprise the digitally represented visual instruction on a uniform dark or black background, in which case the providing of the third video stream comprises the substeps of:
 i. performing a foreground/background segmentation on the second video stream by segmenting each video image of the second video stream into a foreground video image and a background video image such that the digitally represented visual instruction is comprised by the foreground video image, and,
 ii. performing a background replacement on the second video stream by combining each foreground video image with a dark or black background image.

In the preferred embodiment of the system according to the fourth aspect of the present invention, the second mobile device is further configured to analyze the second video stream for determining whether
 the second video stream comprises the digitally represented visual instruction on a uniform dark or black background, in which case the third video stream is a copy of the second video stream, or
 the second video stream does not comprise the digitally represented visual instruction on a uniform dark or black background, in which case the second mobile device is configured to generate the third video stream by performing a foreground/background segmentation on the second video stream by segmenting each video image of the second video stream into a foreground video image and a background video image such that the digitally represented visual instruction is comprised by the foreground video image, and, performing a background replacement on the second video stream by combining each foreground video image with a dark or black background image.

This is advantageous as it conserves computational resources if the second mobile device is used in a dark environment.

The dark or black background is preferably uniform.

The foreground/background segmentation step and the background replacement step in the preferred embodiments of the corresponding second and fourth aspects of the present invention described above may be performed as described further above for the foreground/background segmentation step and the background replacement step in embodiments of the corresponding first and third aspects of the present invention.

BRIEF DESCRIPTION OF THE DRAWINGS

The invention and its many advantages will be described in more detail below with reference to the accompanying schematic drawings, which for the purpose of illustration show some non-limiting embodiments, and in which:

FIG. 4 shows a first embodiment of a method of providing a digitally represented visual instruction, from a specialist operating a visual instruction device to a user in need of said visual instruction in relation to an object of interest, according to the second aspect of the present invention being performed in the first embodiment of a system for providing a digitally represented visual instruction according to the fourth aspect of the present invention.

DETAILED DESCRIPTION

Figure 1:
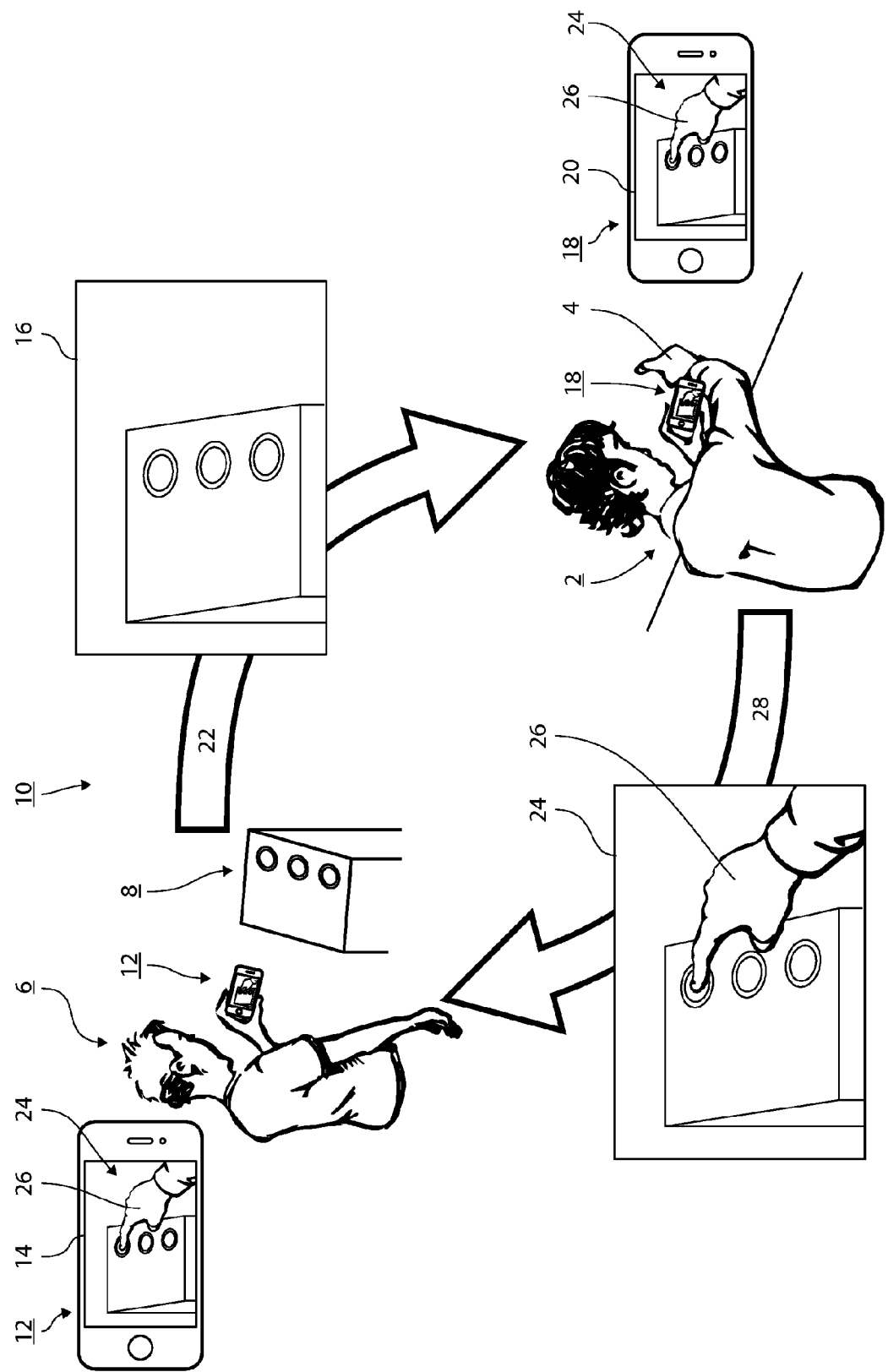
FIG. 1 shows a first embodiment of a method of providing a digitally represented visual instruction, from a specialist operating a visual instruction device to a user in need of said visual instruction in relation to an object of interest, according to the first aspect of the present invention being performed in first embodiment of a system for providing a digitally represented visual instruction according to the third aspect of the present invention.

In the below description, a superscript roman numeral added to a reference number indicates that the element referred to has the same or similar function as the element designated the non-superscripted reference number, however, differing in structure.

In the below description, a subscript Latin numeral added to a reference number indicates that the element referred to is a further one of the element designated the non-subscripted reference number.

When further embodiments of the invention are shown in the figures, the elements which are new, in relation to earlier shown embodiments, have new reference numbers, while elements previously shown are referenced as stated above. Elements which are identical in the different embodiments have been given the same reference numerals and no further explanations of these elements will be given.

FIG. 1 shows a first embodiment of a method of providing a digitally represented visual instruction according to the first aspect of the present invention being performed in the first embodiment of a system for providing a digitally represented visual instruction according to the third aspect of the present invention. The method provides a digitally represented instruction from a specialist 2 operating a visual instruction device represented by the hand 4 to a user 6 in need of the visual instruction in relation to a first scene comprising an object of interest represented by control panel 8. The system 10 comprises a first mobile device 12 comprising a first video camera (not shown), a first display 14, a first image processing circuit (not shown) and a first transmission- and receiving circuit (not shown). The first mobile device 12 is positioned so the first camera captures a first video stream 16 of a first scene including the control panel 8 and so that the user 6 can see the first display 14. The system 10 further comprises a second mobile device 18 comprising a second video camera (not shown), a second display 20, a second image processing circuit (not shown) and second transmission- and receiving circuit (not shown). The second mobile device 18 is positioned so the second video camera captures a second video stream (not shown) of a second scene comprising the hand 4 of the specialist 2, and so that the specialist 2 can see the second display 20.

The first video stream 16 is transmitted by the first transmission- and receiving circuit to the second mobile device 18, as indicated by the arrow 22, where it is received by the second transmission- and receiving circuit and transferred to the second image processing circuit.

The second image processing circuit performs a foreground/background segmentation operation on the second video stream and a background replacement operation on the second video stream with the first video stream 16, replacing the background behind the hand 4 in the second video stream with the images of the first video stream 16, resulting in a third video stream 24 comprising video images of the hand 4, representing the digitally represented visual instruction 26, with the video images in the first video stream 16 as background. Foreground/background segmentation and background replacement is well known in the art of video processing and may comprise the step of creating a travelling matte, masking out the hand 4 from the second video stream which is used to key the second video stream into the first video stream 16. The hand 4 may be well illuminated, for example by a small light source in the second mobile device 18 and positioned over a darker background and the step of creating a travelling matte may comprise a luma keying or chroma keying of the second video stream with the first video stream 16. Luma keying and chroma keying is well known in the art of video processing. Additionally or alternatively, the foreground/background segmentation operation may comprise other methods for foreground/background segmentation known in the art of video- and image processing, including but not limited to edge detection, shape detection and reference image subtraction.

The third video stream 24 is displayed on the second display 20 and essentially simultaneously transmitted by the second transmission- and receiving circuit to the first mobile device 12 as indicated by the arrow 24, where it is received by the first transmission- and receiving circuit and displayed on the first display 14, hence, the third video stream 24 is displayed essentially simultaneously on the first display 14 and the second display 20. Hence, the hand 4 of the specialist 2 is seen over the control panel 8 by both the specialist 2 and the user 6, and the specialist 2 may move the hand 4 to point to features in the control panel 8 or perform gestures or instructional motions over the control panel 8, thus providing the digitally represented visual instruction 26 to the user 6 and by looking at the second display 20, the specialist 2 has a natural and intuitive feedback for positioning his hand 4 and pointing correctly in relation to the control panel 8.

Figure 2:
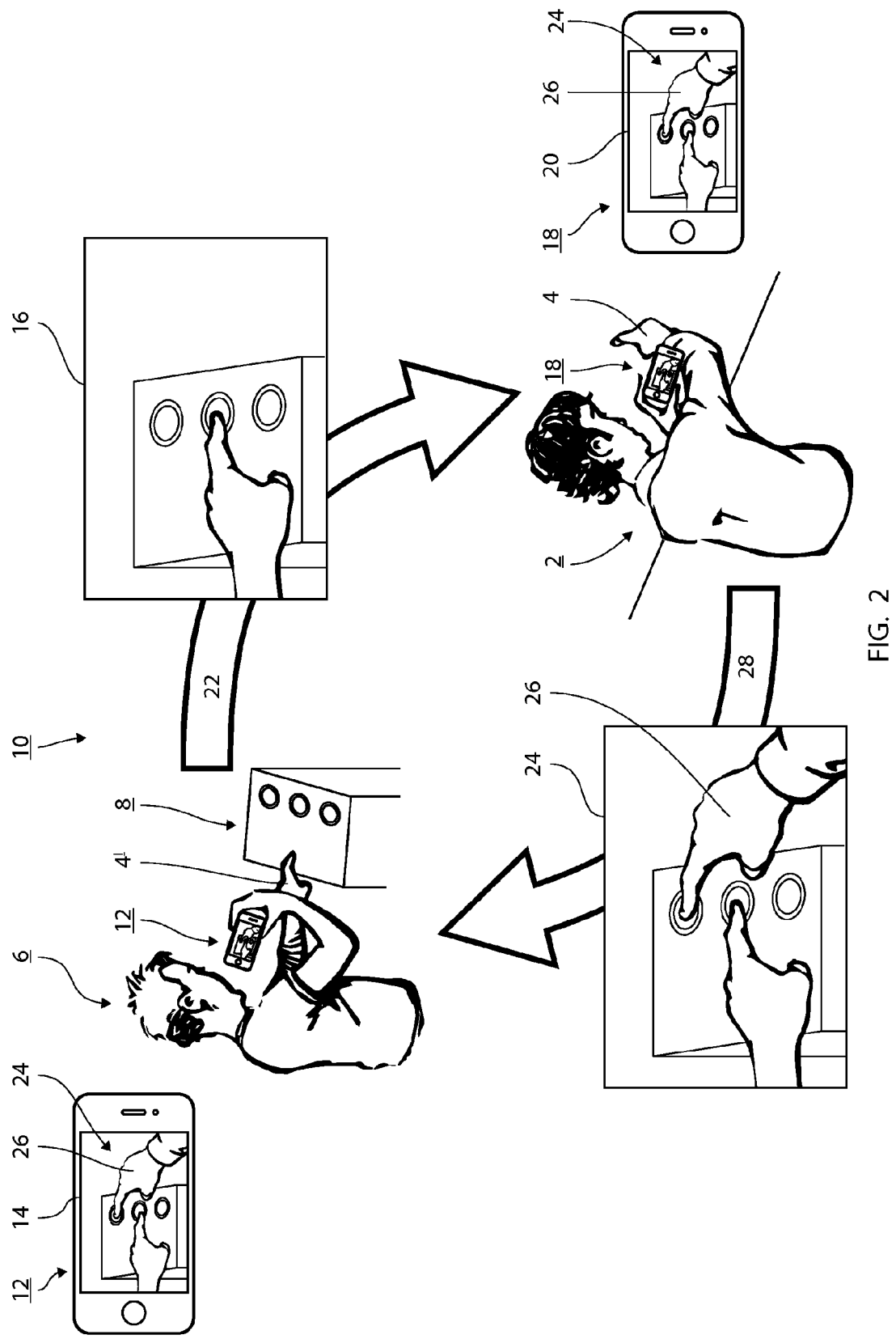
FIG. 2 shows a second embodiment of a method of providing a digitally represented visual instruction, from a specialist operating a visual instruction device to a user in need of said visual instruction in relation to an object of interest, according to the first aspect of the present invention being performed in the first embodiment of a system for providing a digitally represented visual instruction according to the third aspect of the present invention.

FIG. 2 shows a second embodiment of a method of providing a digitally represented visual instruction, from a specialist operating a visual instruction device to a user in need of said visual instruction in relation to an object of interest, according to the first aspect of the present invention being performed in the first embodiment of a system for providing a digitally represented visual instruction according to the third aspect of the present invention. FIG. 2 is similar to FIG. 1, the difference being that the user 6 positions his hand $4^I$, representing a further visual instruction device, between the first camera and the control panel 8 so that the hand $4^I$ is captured in the first video stream 16. Thus the hand $4^I$ becomes comprised by the first video stream 16 and thereby comprised by the third video stream 24 and viewable on the first and second displays 14 and 20. Hence, both the specialist 2 and the user 6 can point to features on the control panel 8 or perform gestures or instructional motions over the control panel 8 and both the specialist 2 and the user 6 by looking on the respective first and second display 14 and 20, have a natural and intuitive feedback for positioning his respective hand 4 and $4^I$ and pointing correctly in relation to the control panel 8.

Figure 8A:
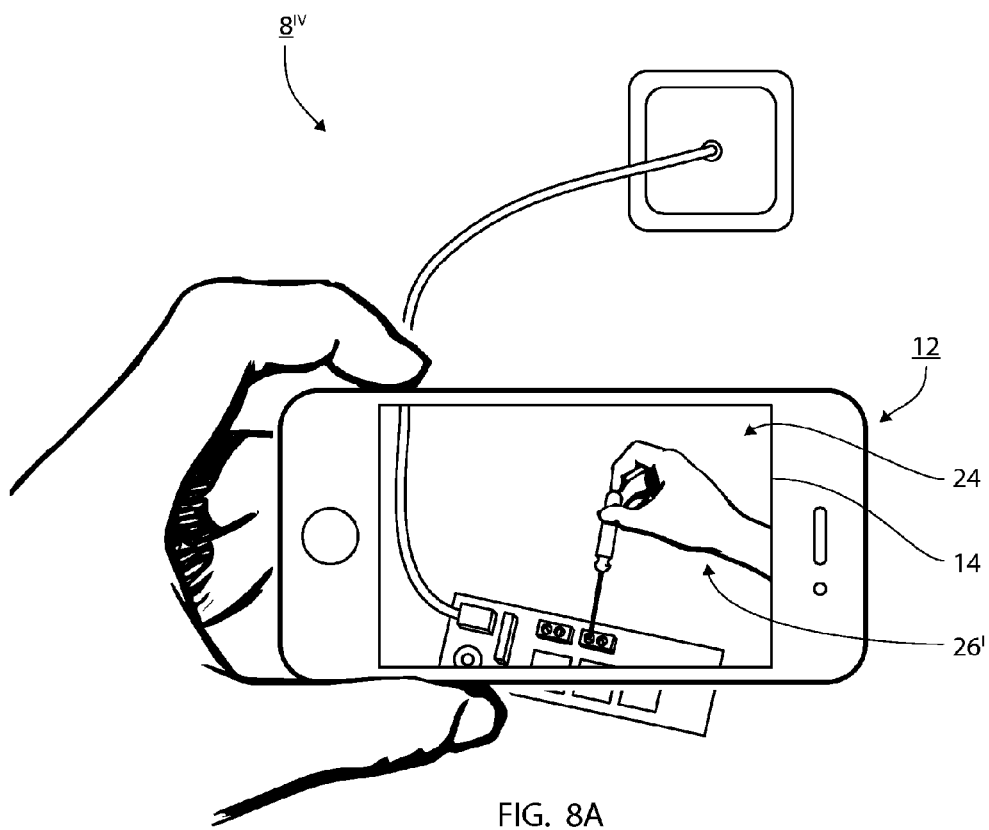
Figure 8B:
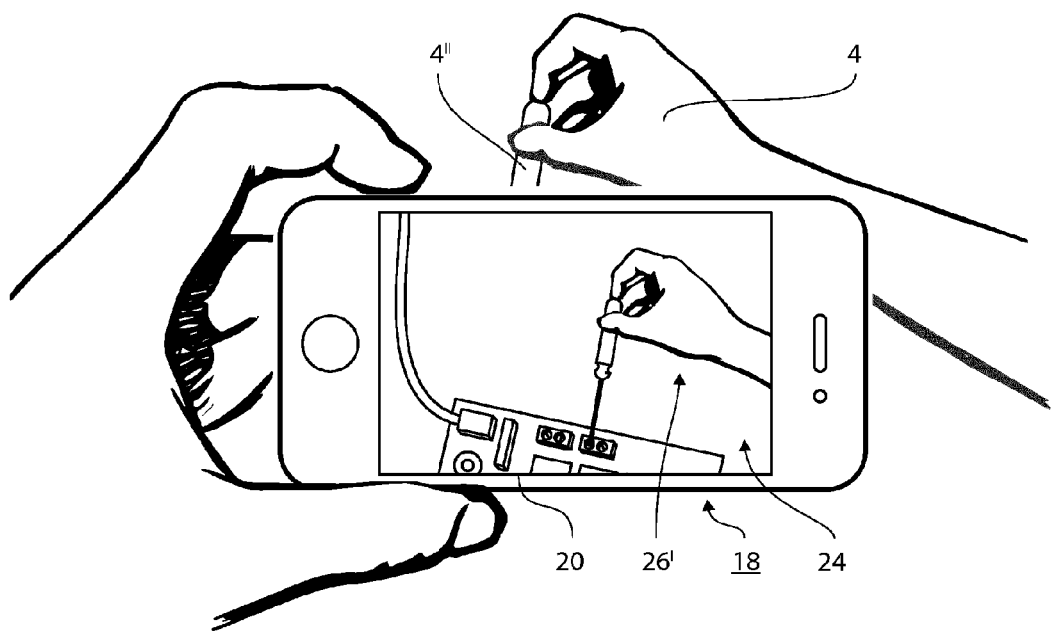

Turning briefly to FIG. 8, the specialist 2 and/or the user 6 may, in addition or instead of the respective hand 4, $4^I$, operate an object such as a tool, in this case a screwdriver $4^{II}$, representing fully or in part a visual instruction device, and operate the screwdriver $4^{II}$ to provide said visual instruction, see FIG. 8B. In this case the foreground/background segmentation operation is configured to recognize, as is known in the art, instead of or in addition to the hand 4, $4^I$, the screwdriver $4^{II}$ as foreground.

As an alternative, not shown in FIGS. 1-2, the foreground/background segmentation operation may create video images of the hand 4 separated over a uniform background resulting in a raw third video stream containing only images of the hand 4 on a uniform background and a background replacement operation may be performed both in the first image processing circuit and in the second image processing circuit to form the third video stream 24 on the second mobile device 18 and display the third video stream 24 on the second display 20 and to form an identical fourth video stream on the first mobile device 12 and display it on the first display 14. The advantage of this configuration is that the raw third video stream may be compressed more efficiently when only comprising images of the separated hand 4, i.e. when only comprising the digitally represented visual instruction 26. Video images in the raw third video stream may labeled with references to video images in the first video stream 16, for example frame numbers, to ensure that the background replacement operations in the first image processing circuit and the second image processing circuit result in essentially identical video images.

Additionally, video image stabilization means to reduce distraction from shaky images, for example if the first mobile device 12 or the second mobile device 18 or both is/are handheld, may be included in the first camera, in the first image processing circuit, in the second video camera or in the second image processing circuit or any combinations hereof. Video image stabilization is well known in the art of video processing and may be either optical or electronic or a combination thereof.

The first mobile device 12 may comprise an accelerometer for detecting movement of the first mobile device 12. The signal from the accelerometer may be used by the video image stabilization means in performing video image stabilization.

The second mobile device 18 may comprise an accelerometer for determining movement of the second mobile device 18. The signal from the accelerometer may be used by the video image stabilization means in performing video image stabilization. Common smartphones and tablets typically comprise accelerometers.

In a particularly advantageous configuration, described below, where the hand 4 does not need to be positioned over a dark background, the specialist 2 holds up the second mobile device 18 in front of him so he can see the second display 20 for a short period, for example a second, and the image processing circuit captures an image from the second video stream and stores this as a background reference image, where after the specialist may insert his hand into the scene captured as the second video stream. The image processing circuit performs a feature detection on the background reference image and identifies features and stores a set of feature information and a first set of feature positions holding their positions. When the camera is moved and new content is introduced into an image in the second video stream, this content may be stitched to the background reference image using image stitching, which is well known in the art of panorama image stitching. The stitching process may take advantage of the already identified features.

The image processing circuit constantly performs a feature tracking between the stored set of features in the background reference image and an image in the second video stream and creates for each image in the second video stream a set of warping vectors by subtracting the positions of the features in the background image from the positions in the image in the second video stream. A reference image is created for each image in the second video stream by warping a copy of the background reference image using the warping vectors and cropping it to the size of the image in the second video stream. Warping and cropping is well known in the art of image processing. Hence, the reference image is now essentially identical to the image in the second video stream, except the hand 4 is not there, instead there is a background where the hand was. A binary travelling matte video stream may now be calculated by subtracting the reference image from the image in the second video stream and performing a binary thresholding operation resulting in pixels above a certain intensity being set to a first pixel value and other pixels being set to a second pixel value.

The travelling matte video stream may now be used to calculate the third video stream 24 comprising the hand 4 composited into the first video stream 16 by keying the second video stream over the first video stream 16. Keying with a travelling matte is well known in the art of video processing. Additionally, a blurring operation, for example a Gaussian blur, may be performed on the travelling matte before the keying for a more visually pleasing look, and additionally or alternatively other techniques known in the art of video keying may be applied.

When the second video camera is moved a bigger distance to the side from which the specialist 2 inserts his hand 4, an undesired situation may occur, where a part of an arm of the specialist may be occluding the background, hence the image content stitched to the reference background image may contain a part of the arm in some area instead of the background, and in this situation the reference image may in some area contain a part of the arm instead of the background and the calculated travelling matte may not cover a part of the arm near the edge of an image of the second video stream, leading to an image in the third video stream 24 where the arm of the hand 4 seems to be cut off near the edge of the image and appear floating. While this may not necessarily interfere with the visual instruction, i.e. the desired pointing and gesturing, it may be visually unpleasing. To counteract this situation, an additional modification of the binary mask may comprise performing an estimation of the extent of the arm towards the side of the binary mask. The estimation of the extent of the arm may comprise determining the sides of the mask corresponding to the sides of the image in the second video stream where additional content has been stitched onto and identifying edges in the binary mask within a distance of said sides of the mask. Identified edges which are not parallel to any of said sides of the mask may be extended, for example by curve interpolation, until any of said sides of the mask is reached and pixels in an area of the binary mask confined by the extended edges, any identified edges parallel to any of said sides of the mask and any of said sides of the masks may have their pixel values set to one.

The first and second image processing circuits may comprise the general data processors and/or the specialized signal processors of the first and second mobile devices, which first and second mobile devices as shown in the figures are preferably smartphones. Furthermore, the first and second image processing circuits may be embodied by software running on the general data processors and/or the specialized signal processors of the first and second mobile devices 12 and 18.

Figure 3:
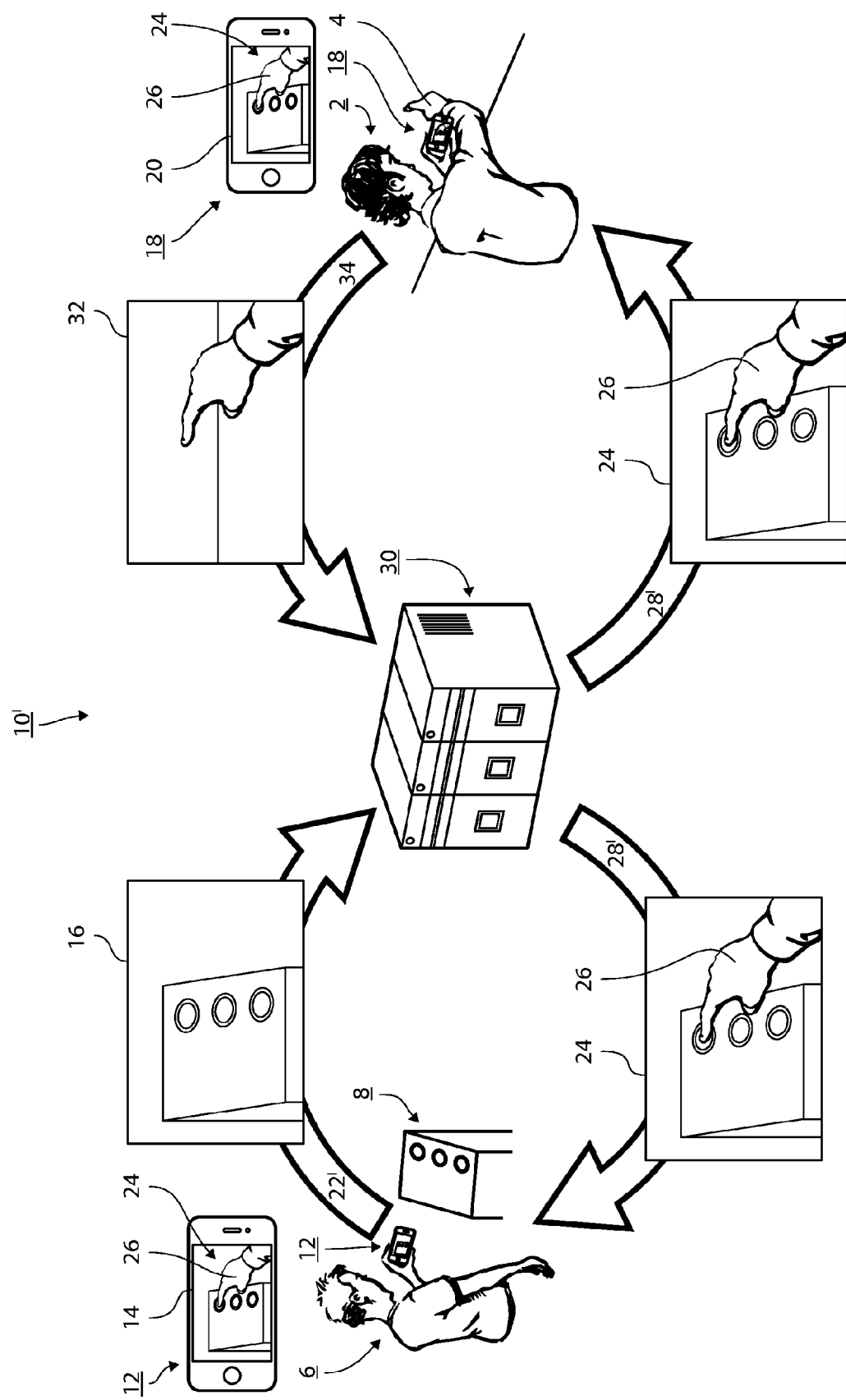
FIG. 3 shows a third embodiment of a method of providing a digitally represented visual instruction from a specialist operating a visual instruction device to a user in need of said visual instruction in relation to an object of interest, according to the first aspect of the present invention being performed in a second embodiment of a system for providing a digitally represented visual instruction according to the third aspect of the present invention.

The transmission of the video streams may be performed by peer to peer transmission. Where the transmission bandwidth is high enough, for example when a 4G network or wireless LAN connection can be established, the transmission of the video streams 16 and 24 may be performed by html streaming to avoid having to set up transmission ports in any firewalls in the transmission path. Alternatively to peer to peer transmission, the transmission of the video streams may be routed through a server. This is shown in FIG. 3 which shows a third embodiment of a method of providing a digitally represented visual instruction, from a specialist 2 operating a visual instruction device, (hand 4) to a user 2 in need of said visual instruction in relation to an object of interest (control panel 8), according to the first aspect of the present invention being performed in a second embodiment of a system $10^I$ for providing a digitally represented visual instruction 26 according to the third aspect of the present invention. The system $10^I$ shown in FIG. 3 differs from the system 10 shown in FIGS. 1 and 2 in that the first mobile device 12 transmits the first video stream 16, to a server 30, as indicated by arrow $22^I$. Essentially simultaneously the second mobile device 18 transmits the second video stream 32 to the server 30 as indicated by the arrow 34. The server 30 performs a foreground/background segmentation operation, as described above, on the second video stream 32 and a background replacement operation, as described above, on the second video stream 32 with the first video stream 16, replacing the background behind the hand 4 in the second video stream 28 with the images of the first video stream 16, resulting in the third video stream 24 comprising video images of the hand 4, i.e. the digitally represented visual instruction 26 with the video images in the first video stream 16 as background. The third video stream 24 is then sent to the first and second mobile devices 12 and 18, as indicated by the arrows $28^I$, and displayed essentially simultaneously on the first and second displays 14 and 20.

The advantages of the configuration as shown in FIG. 3 is that a faster streaming scheme than html streaming may be used with less firewall set-up requirements and further that some of the above described image processing operations used for the foreground/background segmentation and the background replacement operation, as described above for forming or calculating the third video stream 24, such as feature detection and -tracking, keying etc., may be performed in the server 30, thereby reducing the requirements for the processing power of the mobile devices 12 and 18, allowing a great range of commercially available smartphones to be used as the mobile devices 12 and 18.

FIG. 4 shows a first embodiment of a method of providing a digitally represented visual instruction from a specialist 2 operating a visual instruction device (hand 4) to a user 2 in need of said visual instruction in relation to the object of interest (control panel 8), according to the second aspect of the present invention being performed in first embodiment of a system $10^{II}$ for providing a digitally represented visual instruction according to the fourth aspect of the present invention. The system $10^{II}$ differs from the system 10 in that a modified first mobile device $12^I$, comprising a projector (not shown) is used and that a modified third video stream $24^I$ comprising the digitally represented visual instruction 26 separated on a uniform dark or black background is generated from the second video stream and sent to the modified mobile device $12^I$. The projector in the modified mobile device $12^I$ projects the third video stream onto the control panel 8, thus forming a projection 36 of the digitally represented visual instruction 26 upon the control panel 8. The first camera of the modified mobile device $12^I$ captures the first video stream 16, which now includes the digitally represented visual instruction 26 of the projection 36 and sends it to the second mobile device 18 as indicated by the arrow 22. On the second mobile device 18 the first video stream 16 is displayed on the second display 20, whereupon it is viewable by the specialist 2 allowing the specialist 2 to see the position of his hand 4 by the projection 36 and the digitally represented visual instruction 26 upon the object of interest 8. Thus, the specialist 2 can naturally and intuitively position and orient his hand 4 in relation to the object of interest comprised by the first video stream shown on the second display to point to features or perform gestures.

There is thus no need for background replacement operations of the second video stream with the first video stream 16 being performed neither in the first image processing circuit, nor in the second image processing circuit, thus decreasing the amount of calculations needed in the mobile devices 12 and 18. The first video stream 16 will contain images of the control panel 8 with images of the lighter hand 4 on a darker background, i.e. the projection 36, projected onto it. The first video stream is visible on the second display 20 and shown in FIG. 4 although not necessary, on the first display 14.

The method and system shown in FIG. 4 is advantageous in that it requires less computational resources in the first and second mobile devices 12 and 20 and in that it frees the user 6 from having to look at the first display 14, hence he may not need to hold the first display 14 up in front of him but may place the first mobile device 12 on a stand or surface at hand or he may even wear it, for example in a neck string, a head belt or a hardhat: This allows the user to move about the object of interest and it allows him to have both his hands free so he can for example perform actions with both hands on the control panel 8 or use one hand to hold for example a manual and the other hand to point or perform actions to the control panel 8.

An image enhancement operation may be performed on the modified third video stream $24^I$ before it is projected by the projector. The image enhancement operation may comprise a contrast enhancement, a sharpening, an edge sharpening, a thresholding operation or combinations hereof.

If the specialist 2 and the second mobile device 18 are in a dark environment, then the modified third video stream $24^I$ may be provided by simply copying the second video stream or alternatively the second video stream is used as the modified third video stream $24^I$.

Otherwise the modified third video stream is provided by generating it from the second video stream using above described foreground/background segmentation and using a simple background replacement operation on the second video stream with a uniform black or dark background.

As an alternative to that shown in FIG. 4, a separate projector such as a pocket projector and the first mobile device 12 shown in FIGS. 1-3, may be used. In this case the projector may be connected to the first mobile device 12 to receive the third video stream 24$^T$ received on the first mobile device 12 from the second mobile device 18, or alternatively the projector may receive the third video stream 24$^T$ directly from the second mobile device 18, or via a further mobile device or computer to which the projector is connected.

In case the modified first mobile device 12$^T$ is used it may comprise a mirror (not shown) to redirect the beam of the projector, or alternatively the capturing direction of the first camera, if the direction of the projector and the camera are not the same. The first image processing circuit may perform a mirroring function to compensate for the mirror.

In the methods and systems shown in the figures push notifications, ring tones or vibration may be used to alert the specialist 2 that the user 6 wishes to receive visual instructions from the specialist 2.

Further, in the methods and systems shown in the figures, audio communication between the user 6 and the specialist 2 is preferably provided using the cellular network or via IP telephony. Preferably, the audio communication is bi directional.

In the systems shown in FIGS. 1-4, a first software application present on the first mobile device 12 may be used to control the process of capturing and sending the first video stream 16 and receiving and displaying the third video stream 24. A second software application present on the second mobile device 18 may be used to control the process of capturing the second video stream, performing the foreground/background segmentation, providing the third video stream, including where applicable the background replacement operation on the second video stream with the first video stream 16 and sending the third video stream 24 to the first mobile device 12 and displaying the third video stream 24, or alternatively, in the method shown in FIG. 4, display the first video stream 16.

Alternatively, a single software application having the capabilities of the first and second software applications, as listed above, may be used in both first and second mobile devices 12 and 18. In this case the user 6 may set the software application to "user mode", thus indicating that he would like to receive visual instruction and that the operations of the first software application, as described above, should be executed on the first mobile device 12. Likewise, the specialist 2 may set the software application to "specialist mode", thus indicating that he is prepared to provide visual instruction and that the operations of the second software application, as described above, should be executed on the second mobile device 12.

The connection between the user 6 and the specialist 2 may be direct, for example in case the user 6 knows or has access to contact details, for example a telephone number, IP address, online identity or other identifying information of the specialist. This may be the case for example where the user 6 and the specialist 2 are related by for example being agent and client, friends, workmates, part of the same organization, etc. Alternatively, the connection between the user 6 and the specialist 2 may be arranged, possibly brokered, via a communications centre, in which case the user 6 need only know or have access to contact details to the communication centree. This may be the case where the user 6 and the specialist 2 do not know each other, or where there are many specialists who can and are willing to assist the user 2, examples being customer and customer care service, private person and specialist such as plumber, computer technician or, electrician. In this case the communication centre may receive the request to obtain visual instruction from the user 6 and present it to several specialists, which specialists are then allowed to make their offers to the user 6, where after the user 6 may select one of the specialists to obtain the visual instructions from.

In one business model the communications centre may charge a fee from the specialists for being presented with the user's request and being allowed to make their offers to the user, and/or from the users wishing to have their request being presented to the specialists. Fees may also be charged for each time unit, e.g. minute, that the visual instructions are provided to the user.

In another business model there is no communications centre, however, a fee is charged from the user and the specialist by the maker of the software application for each mobile device on which the software application is installed. In some cases the software application may be provided free of charge, however, the software application may contains adverts or commercials from which the maker of the software application may collect revenue, the latter case being compatible with a communications centre as described above, such that the user 6 needs to use the communications centre if he is in need of visual instruction from a specialist he does not have the contact details to. Further, in the case shown in FIG. 3 where the server 30 is used, one business model may include providing the software application free of charge, but requiring a subscription or the payment of a fee to use the server 30.

The methods described above with reference to FIGS. 1-3 may be performed also when the first display 14 is transparent, provided that the first mobile 12, when receiving the third video stream 24, generates a fourth video stream (not shown), or alternatively generates a modified third video stream by subtracting the first video stream from the third video stream such that all pixels having the same pixel values in both the first and third video stream 15 and 24, are set to pixel values which yield transparent pixels when displayed on the first display.

Alternatively, the methods shown in FIGS. 1-3 may be performed also when the first display 14 is transparent, provided that the second video stream 32 or the third video stream 24 is first sent to the first mobile device 12, in which a fourth video stream or a modified third video stream comprising the digitally represented visual instruction 26 in the foreground and with a background having pixel values, which results in the background being transparent when displayed on the first display, is generated by the first mobile device 12 by a foreground/background segmentation and background replacement on the second or third video stream as described above.

Figure 5A:
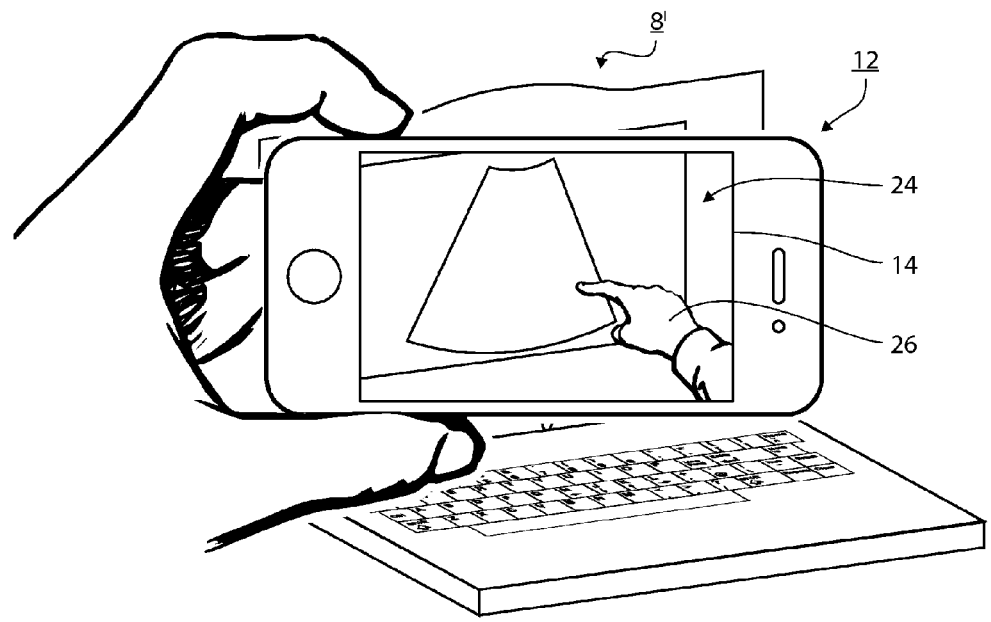
FIGS. 5-8 shows embodiments of the method of providing a digitally represented visual instruction according to the first aspect of the present invention being performed with differing objects of interest, FIG. 8 additionally showing the specialist using an object, in this case a screwdriver, as a part of the visual instruction device.
Figure 5B:
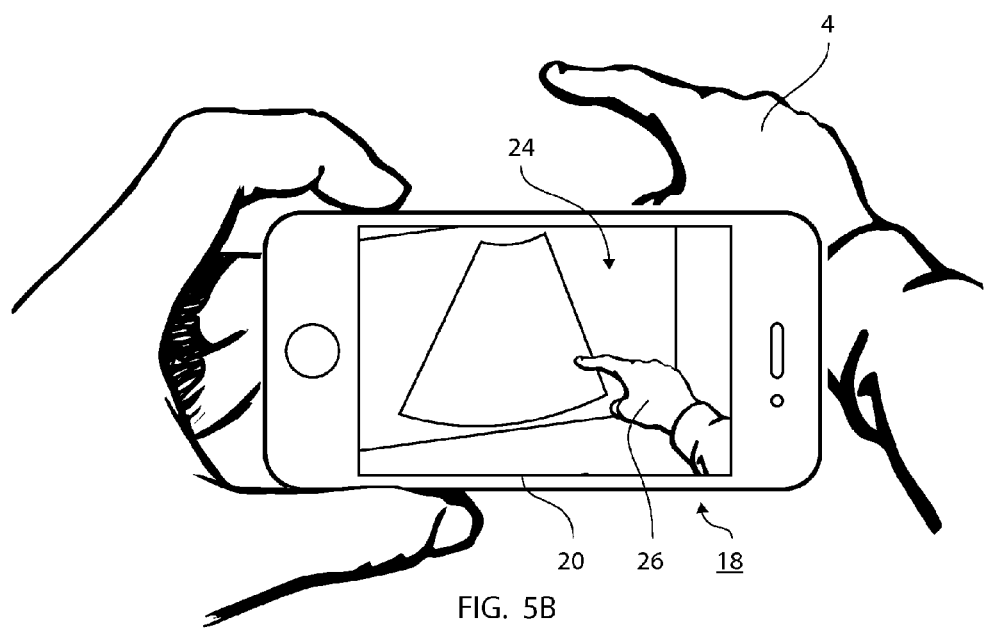

FIG. 5 shows embodiments of the method of providing a digitally represented visual instruction according to the first aspect of the present invention being performed with an object of interest represented by a screen 8$^T$ of a computer associated with medical equipment. In this case the user 6, for example a midwife at a maternity institution standing in front of the screen 8$^T$ is provided with the digitally represented visual instruction 26, as shown in FIG. 5A, from the specialist 2, for example a doctor at another location such as his or her home, who can provide the digitally represented visual instruction 26 using the second mobile device 18 as shown in FIG. 5B. The digitally represented visual instruction 26 may for example help the user 2 to interpret the screen 8$^T$ or to find interesting areas in the screen 8$^T$. The specialist 2 may for example instruct the user 2, by pointing with hand 4, to enlarge a specific part of the screen 8$^T$.

Figure 6A:
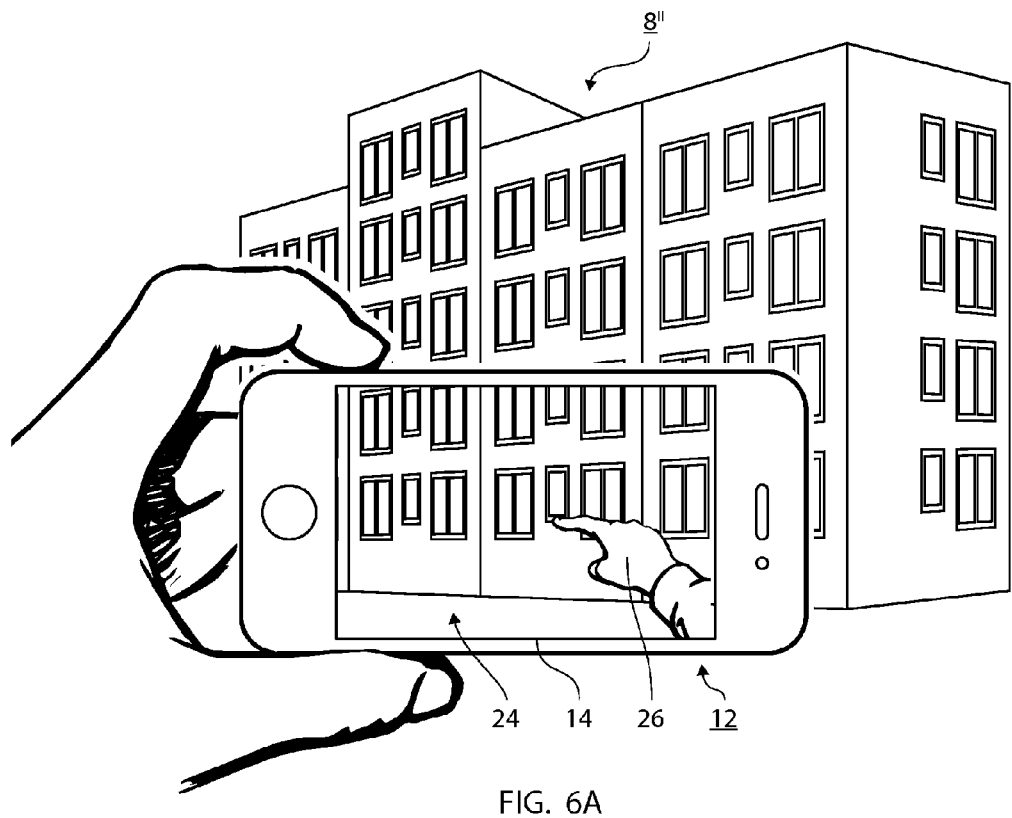
Figure 6B:
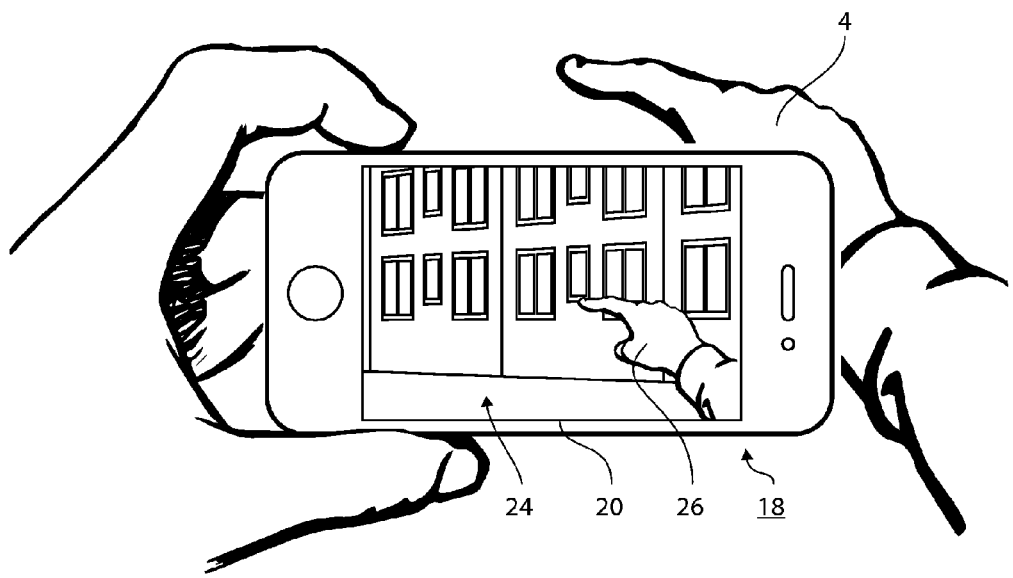

FIG. 6 shows embodiments of the method of providing a digitally represented visual instruction according to the first aspect of the present invention being performed with an object of interest represented by a building $8^{II}$. In this case the user 6, for example a subcontractor or craftsman, standing in front of the building $8^{II}$, is provided with the digitally represented visual instruction 26, as shown in FIG. 6A, from the specialist 2, for example an employer, foreman, customer, or architect at another location, who can provide the digitally represented visual instruction 26 using the second mobile device 18 as shown in FIG. 6B. The digitally represented visual instruction 26 may for example help the user 2 to find which part of the building $8^{II}$ he should work on. The specialist 2 may for example instruct the user 2, by pointing with the hand 4, to move closer to a part of the building $8^{II}$ and focus on a color or texture of the building materials.

Figure 7A:
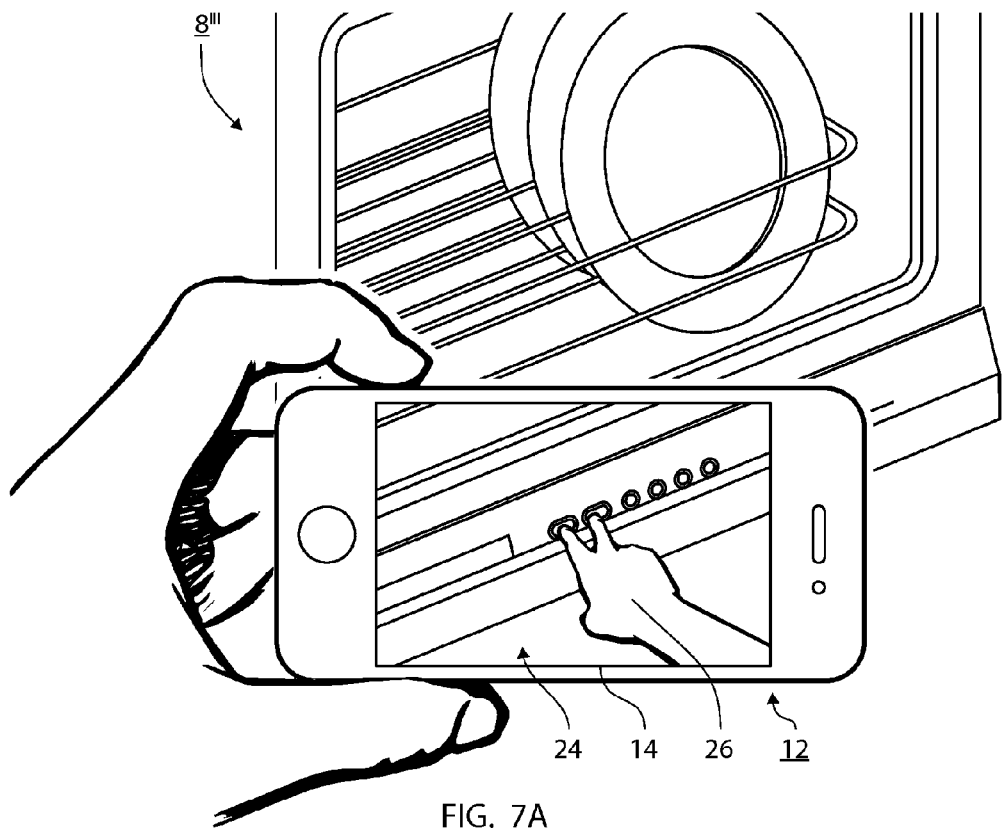
Figure 7B:
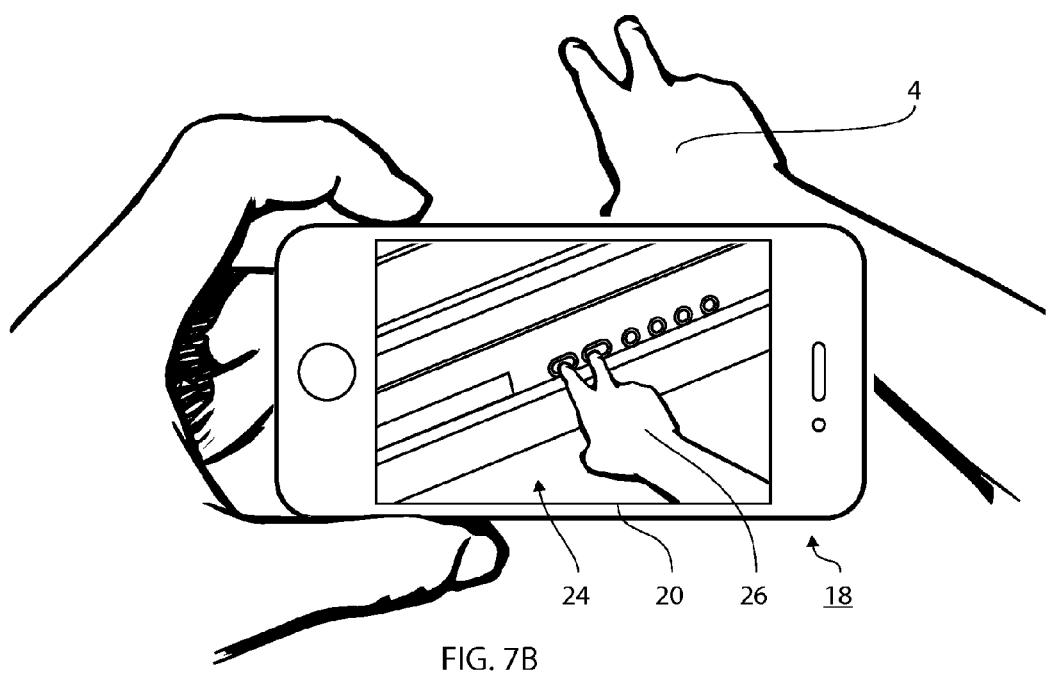

FIG. 7 shows embodiments of the method of providing a digitally represented visual instruction according to the first aspect of the present invention being performed with an object of interest represented by a dishwasher $8^{III}$ with a control panel. In this case the user 6, for example a home owner, standing in his or her home in front of the dishwasher $8^{III}$ is provided with the digitally represented visual instruction 26, as shown in FIG. 7A, from the specialist 2, for example a customer service employee or repair man at another location, who can provide the digitally represented visual instruction 26 using the second mobile device 18 as shown in FIG. 7B. The digitally represented visual instruction 26 may for example help the user 6 to operate the dishwasher $8^{III}$. The specialist 2 may for example instruct the user 6, by pointing with hand 4, to simultaneously press two buttons on the control panel of the dishwasher $8^{III}$ to reset the dishwasher to factory default.

FIG. 8 shows embodiments of the method of providing a digitally represented visual instruction according to the first aspect of the present invention being performed with an object of interest represented by an electrical installation $8^{IV}$. In this case the user 6, for example a home owner, standing in his or her home in front of the electrical installation $8^{IV}$ is provided with the digitally represented visual instruction $26^{I}$ shown in FIG. 8A, which digitally represented visual instruction $26^{I}$ as shown in FIG. 8B includes both the hand 4 and the screwdriver $4^{II}$ to provide the visual instruction. The digitally represented visual instruction $26^{I}$ may for example help the user 6 to troubleshoot the electrical installation $8^{IV}$. The specialist 2 may for example instruct the user 6, by positioning and moving screwdriver $4^{II}$, to loosen a screw in the electrical installation $8^{IV}$.

Figure 9C:
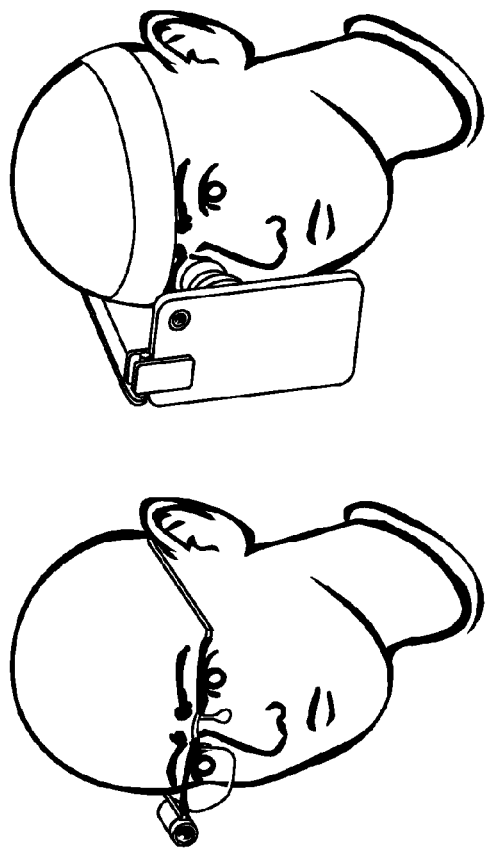
FIG. 9 shows different embodiments of the first and second mobile devices being affixable to the head of the user and the specialist, as well as headgear devices for holding the first and second mobile devices and being affixable to the head of the user and the specialist.
Figure 9A:
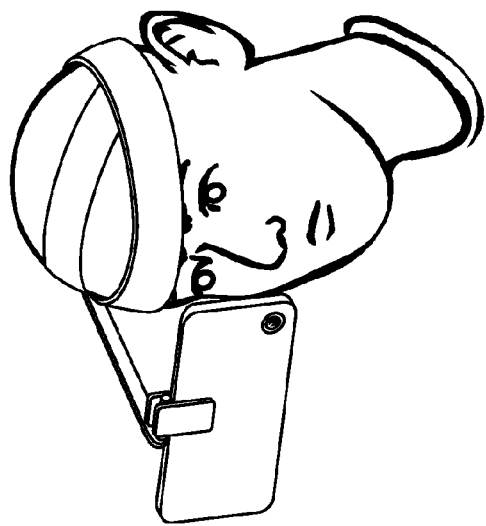

FIG. 9A shows an alternative embodiment of a first mobile device $12^{II}$ in the form of glasses 38 representing a first headgear device. A transparent first display $14^{I}$ is held by the glasses and positioned in front of one eye of the user 6 as the glasses 38 are affixed, by being worn by the user 6, to the head of the user 6. The other eye of the user 6 is free. The glasses 38 carry a first camera 40 which is positioned adjacent the transparent first display $14^{I}$. A computing module, a transceiver module, and a power supply is integrated with the glasses 38 (not shown).

Figure 9F:
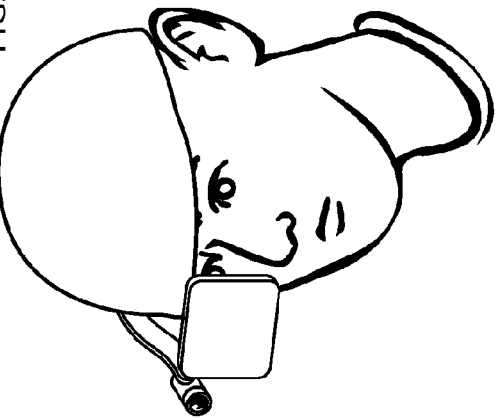
Figure 9E:
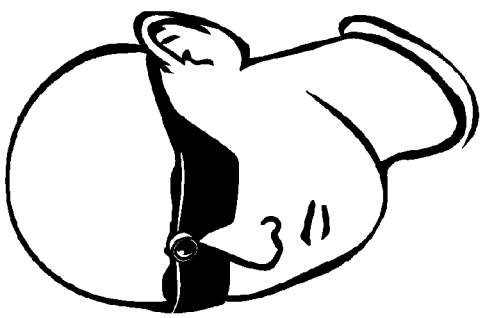
Figure 9D:
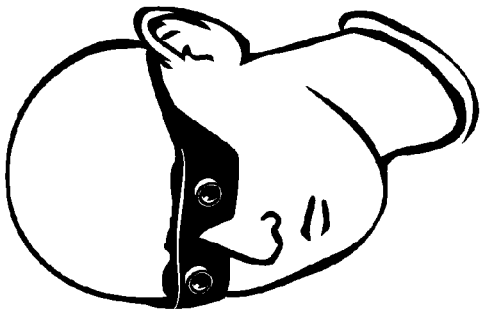
Figure 9B:

FIG. 9B shows a first mobile device being 12 used with a headband 42, to which an arm 44 carrying a holding device represented by clamp 46 and a lens 48 is attached. The headband 42, arm 44, clamp 46 and lens 48 together represent a first headgear holding device. The clamp 46 represents a first holding device and holds the first mobile device 12. The lens 48 helps the eye of the user 6 to focus properly on the first display.

FIG. 9C shows a first mobile device being 12 used with a modified headband $42^{I}$ having a vertical headband 50 for a stronger fixation to the head of the user 6, the headband $42^{I}$ carrying a modified arm $44^{I}$, which is longer than the arm 44. As the arm $44^{I}$ is longer, there is no need for lens 48 because the first mobile device 12 is positioned at a suitable distance from the eyes of the user 6. The first mobile device 12 is held by the clamp 46, such that the first display is viewable by both eyes of the user 6. The vertical headband 50 ensures that the headband 42 and the vertical headband 50 do not slip on the head of the user 6 due to the increased torque applied on them from the weight of the first mobile device 12 on the arm $44^{I}$.

FIG. 9D shows a further alternative embodiment of a first mobile device $12^{III}$ in the form of a helmet 52 representing a first headgear device. A non-transparent first display $14^{II}$ and a first camera 40 are connected to the helmet 52 via an arm 54. A computing module, a transceiver module and a power supply is mounted on the back of the helmet (not shown).

FIG. 9E shows a further alternative embodiment of a first mobile device $12^{IV}$ in the form of glasses 56 representing a first headgear device. A transparent first display $14^{III}$ and a further transparent first display $14^{III}_{1}$ are integrated with a frame and a camera 40 to form the glasses 56. Both first displays $14^{III}$ and $14^{III}_{1}$ show the same video stream. A computing module, a transceiver module and a power supply are integrated with the glasses 56 (not shown).

FIG. 9F shows a further alternative embodiment of a first mobile device $12^{V}$ in the form of glasses $56^{I}$ representing a first headgear device. A first display $14^{IV}$ and a further transparent first display $14^{IV}_{1}$ are integrated with a frame and a first camera 40 and a further first camera $40_{1}$ to form the glasses $56^{I}$. The first display $14^{III}$ is operably connected to camera 40 and the further first display $14^{III}_{1}$ is operably connected to the further first camera $40_{1}$ to provide stereoscopic vision for the user 6.

A computing module, a transceiver module, and a power supply is integrated with the glasses $56^{I}$ (not shown).

Although FIGS. 9A-9F have been described with reference to the user 6, the first mobile device 12 and first display 14, the figs and description apply also to the second mobile device 18 and the specialist 2 with the necessary modifications as regards first-second and user-specialist etc.

FIG. 10 shows foreground/background segmentation and background replacement steps in an embodiment of a method of providing a digitally represented visual instruction, from a specialist operating a visual instruction device to a user in need of said visual instruction in relation to an object of interest, according to the first aspect of the present invention.

The steps shown in FIG. 10 require that the second mobile device 18 is provided with a light source, for example an LED. The led is energized intermittently for illuminating every second frame of the second video stream.

Further, the steps shown in FIG. 10 require that the ambient lighting of the second scene is not too intense. Thus, the steps shown in FIG. 10 are best suited for second scenes that are indoors.

Figure 10A:
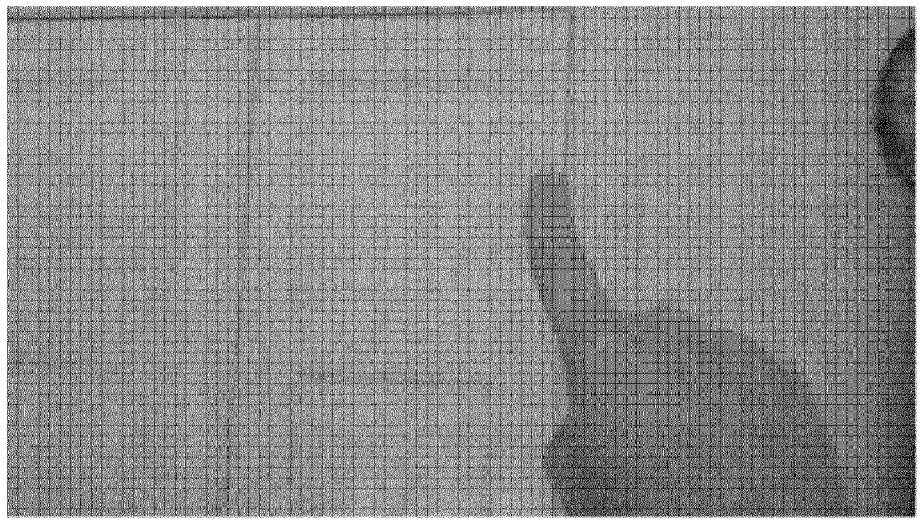
FIG. 10 shows foreground/background segmentation and background replacement steps in an embodiment of a method of providing a digitally represented visual instruction, from a specialist operating a visual instruction device to a user in need of said visual instruction in relation to an object of interest, according to the first aspect of the present invention.

FIG. 10A shows a second scene that has been recorded as a first frame of the second video stream. The frame shown in FIG. 10A was recorded with the light source off and thus approximates how the specialist 2 sees the second scene. The figure clearly shows a hand having an outstretched index finger, the hand representing the visual instruction device, in the foreground and a background comprising a wall and a double door with a door frame. The straight lines of the double door and door frame are clearly seen in FIG.

10A. The lighting and brightness of FIG. 10 is uniform, the background is a little brighter than the hand.

Figure 10B:
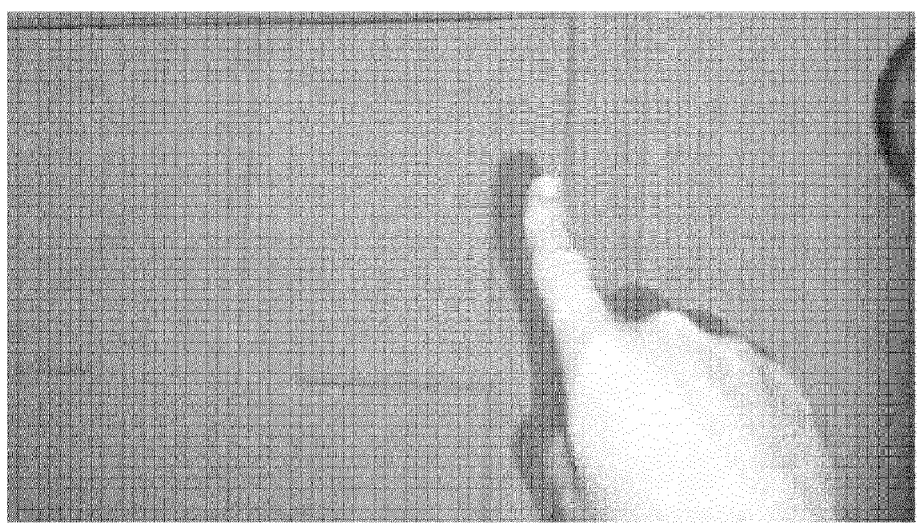

FIG. 10B shows the same scene as FIG. 10A as it has been recorded as a second frame of the second video stream. The second frame has been recorded with the light source on. Due to the difference in distance between the light source and the hand on one side, and between the light source and the background, i.e. the wall, double door and door frame, on the other side, the hand is now brighter than the background, even though the background in FIG. 10B is brighter than the background in FIG. 10A. It is still possible to see the straight lines of the double door and door frame in the background whereas some of the features of the hand have now been lost due to the brightness.

Figure 10C:
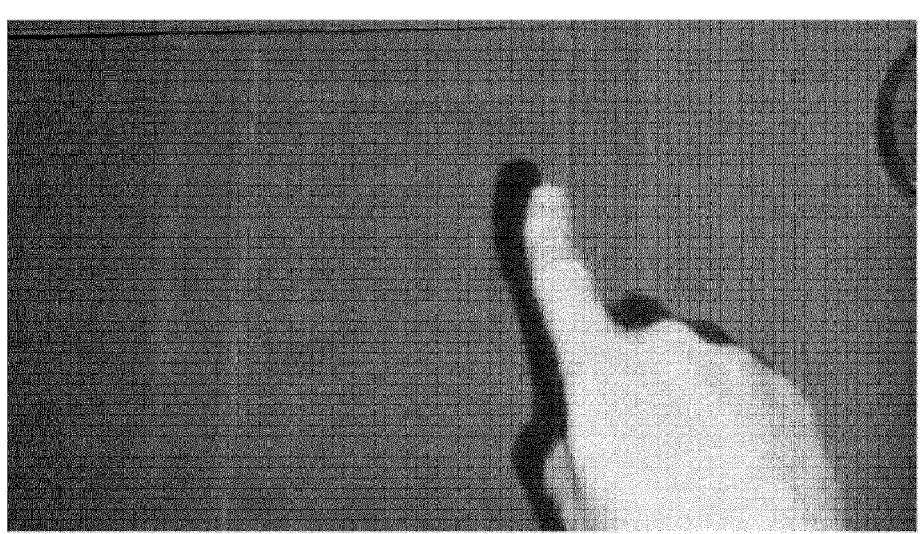

FIG. 10C shows a differential frame which is the result of a subtracting a grayscale transformation of FIG. 10B from a grayscale transformation of FIG. 10A, i.e. FIG. 10C equals grayscale (FIG. 10A)—grayscale (FIG. 10B). FIG. 10C shows the hand brightly lit, corresponding somewhat to the hand in FIG. 10B, whereas the background, i.e. the wall, double door and door frame, are darker corresponding somewhat to the background in FIG. 10A.

Figure 10D:
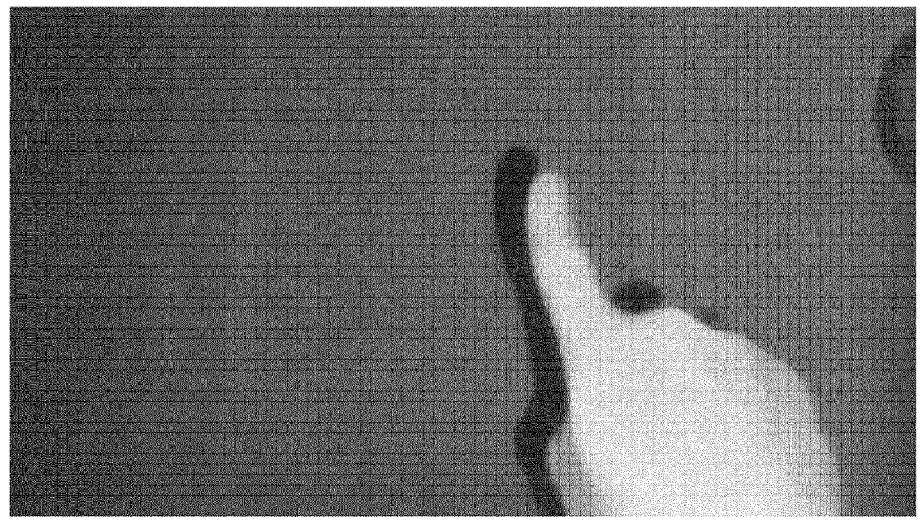

FIG. 10D shows a filtered differential frame which is the result of a median filtering of FIG. 10C, i.e. FIG. 10D equals median filtering (FIG. 10C). Median filtering replaces the value of each pixel in the image with the median of the values of the neighbouring pixels. This has the effect of removing noise and small details in the image, thus in FIG. 10D it is no longer possible to see details of the hand and although some vague features of the background are still present it is no longer possible to see the straight lines of the double door and door frame. Although FIG. 10D shows the result of median filtering, other types of noise filtering is possible.

Figure 10E:
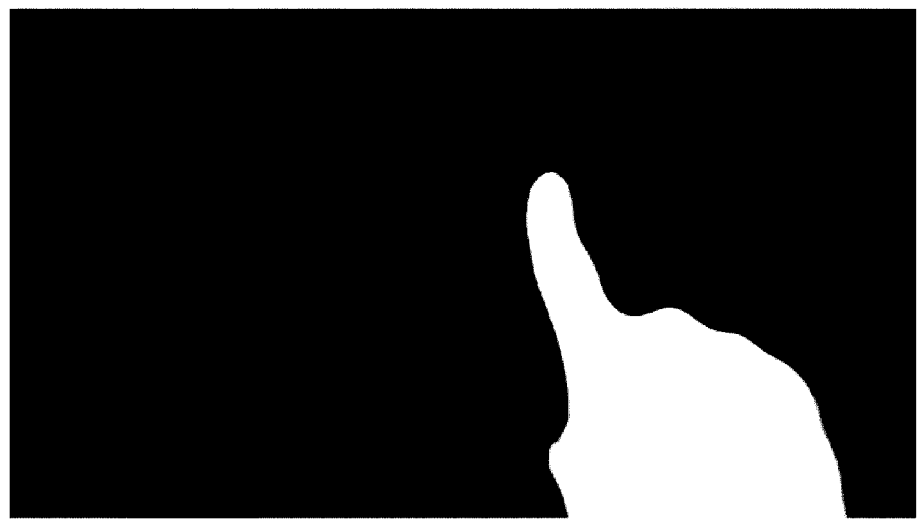

FIG. 10E shows a foreground mask which is the result of threshold operation on FIG. 10E, i.e. FIG. 10E equals threshold (FIG. 10D). A threshold operation sets the pixel value of pixels having a pixel value below a certain threshold to 0, i.e. black, and sets the pixel value of pixels having a pixel value above the threshold to 1, i.e. white. Thus, in FIG. 10E all the bright pixels in FIG. 10D, i.e. the pixels defining the hand, are set to 1, i.e. white, whereas all the dark pixels in FIG. 10D, i.e. the pixels defining the background, are set to 0, i.e. black. The foreground mask indicates, by the pixel value 1, which pixels belong to a foreground segment of the first frame of the second video stream, i.e. the hand, and by the pixel value 0, which pixels belong to the background segment of the first frame of the second video stream, i.e. the background wall, double door, door frame and wall.

The foreground mask shown in FIG. 10E may now be used in a background replacement operation to replace the background of FIG. 10A, i.e. the background of the first frame of the second video stream, with the background of a temporally corresponding frame of the first video stream 16 for generating a frame of the third video stream 24. The frame of the third video stream 24 is generated by multiplying the first frame of the second video stream, i.e. FIG. 10A with the foreground mask, i.e. FIG. 10E, and adding the product of this multiplication to a frame of the first video stream multiplied with the inverse of the foreground mask. In a formula FIG. 10F equals (FIG. 10A×FIG. 10E)+(frame from first video stream 16×(1−FIG. 10E)).

The inverse of the foreground mask is a background mask which indicates, by the value 1, which pixels belong to the background.

Figure 10F:
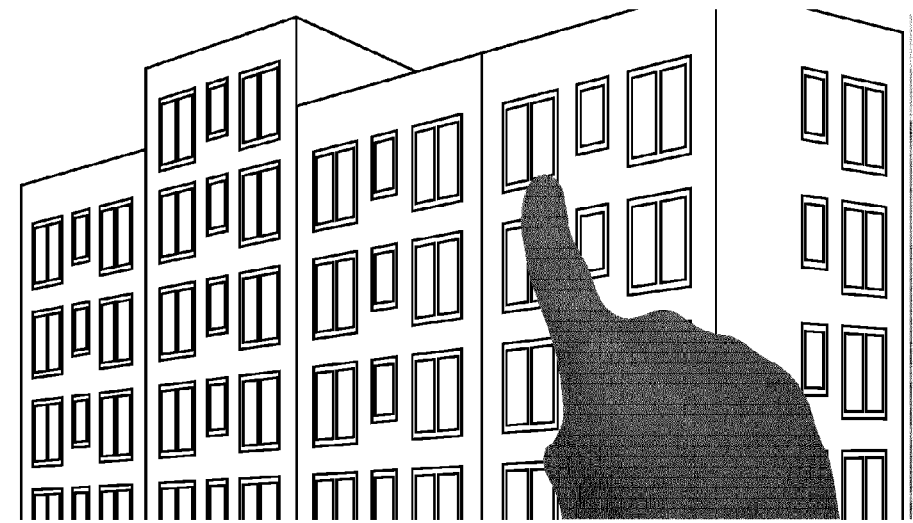

Thus, FIG. 10F shows the hand from FIG. 10A segmented from the background of FIG. 10A and positioned over a frame from the first video stream 16, in this case a frame depicting a building.

The steps illustrated with reference to FIG. 10 require very little computational power and are especially suited for when the third video stream 24 is generated by the second mobile device 18. The transformations and operations resulting in FIGS. 10C-10F are simple matrix operations and do not involve any tracking of feature recognition.

If the lighting of the second scene is too bright, for example outdoors on a sunny day, the light source will not be able to illuminate the hand suitably for causing it to be recorded brighter in FIG. 10B than in FIG. 10A. It is therefore contemplated that the light source, as an alternative to emitting visible light, which is the case in FIG. 10B, may instead or in addition emit light of a special wavelength which allow the light source to illuminate the hand despite the light from the sun. This special wave length may for example be infrared. In this case, the second camera of the second mobile device 18 must also be capable of recording this special wavelength.

FIGS. 11-17 show foreground/background segmentation and background replacement steps in another embodiment of a method of providing a digitally represented visual instruction, from a specialist operating a visual instruction device to a user in need of said visual instruction in relation to an object of interest, according to the first aspect of the present invention.

Figure 11:
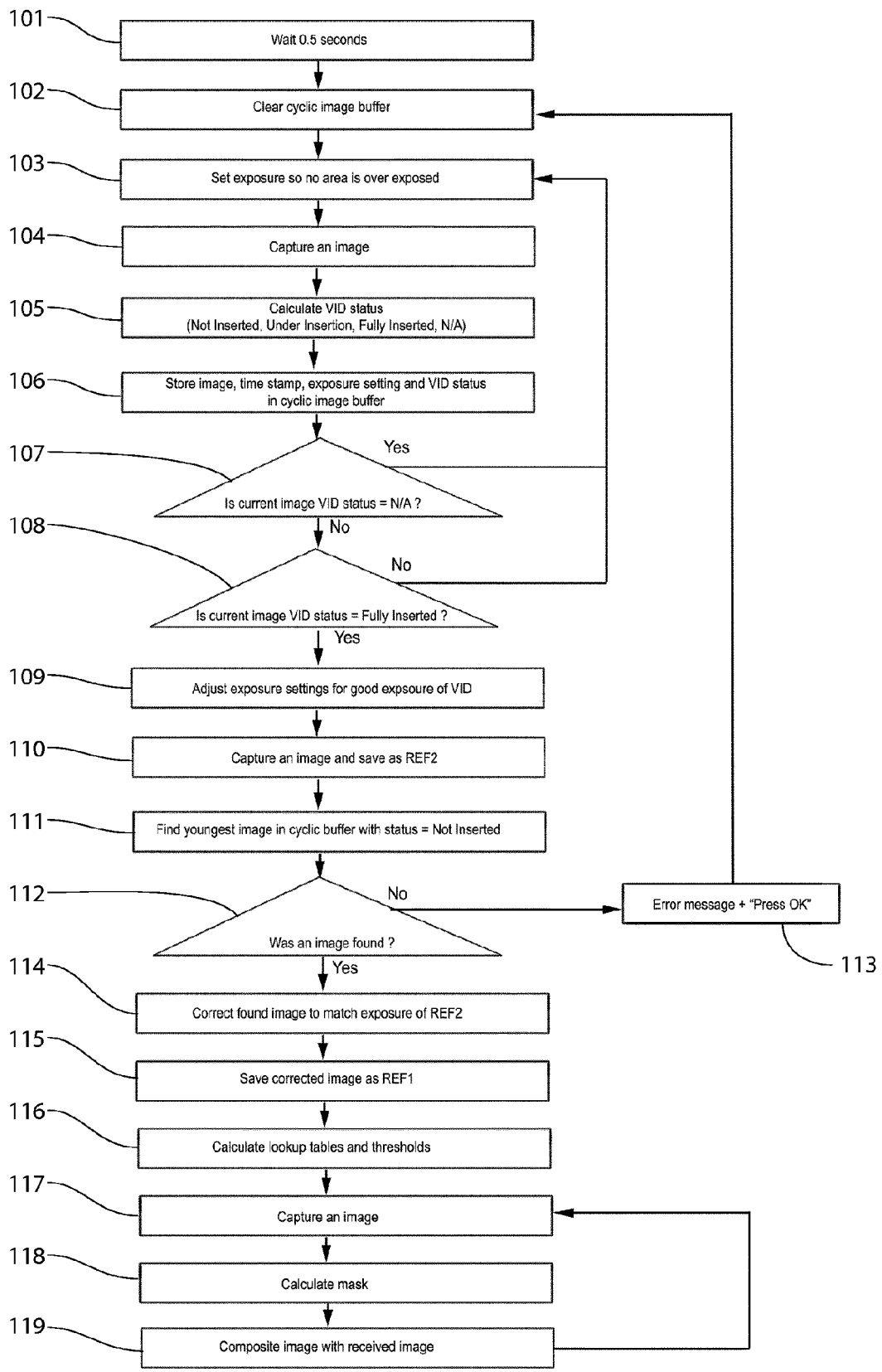
FIG. 11 shows a flow chart of an example of how the calibration procedure may establish the first reference image Ref1 and the second reference image Ref2, and how these reference images are used for the mask calculation procedure and the foreground/background segmentations and background replacement steps.

FIG. 11 shows a flow chart of an example of how the calibration procedure may establish the first reference image Ref1 and the second reference image Ref2, and how these reference images are used for the mask calculation procedure and the foreground/background segmentations and background replacement steps.

The calibration procedure may comprise updating a cyclic image buffer storing a number of images and for each stored image it may also store a time stamp, indicating the time the stored image was recorded, and for each stored image it may also store an exposure setting recording, indicating the exposure settings used when the stored image was recorded and for each stored image is may also store a status variable VIDstatus which may indicate whether the visual instruction device was fully inserted, not inserted, under insertion or undecided, where fully inserted may mean that the visual instruction device is sufficiently included in the stored image for the stored image to be used as a basis for the second reference image Ref2 and where not inserted may mean that it is essentially not visible in the stored image and that the stored image may be used as a basis for the first reference image Ref1 and where under insertion may mean that it is partially inserted but not sufficiently included in the stored image for the stored image to be used as the second reference image Ref2 and undecided may mean that it is not possible to determine any of these situations.

Step 1, designated the reference numeral 101, in the calibration procedure may comprise waiting a short period of time, for example 0.5 second. This may avoid processing overhead due to frequent initiations of the calibration procedure caused by the second mobile device changing it's position frequently, for example when the specialist is moving around looking for a suitable location to continue a session. If the mobile device has not changed position for a period of for example 0.5 seconds, there may be a good chance that it will not be changing position the next few seconds, so the calibration procedure may complete. Hence many initiated calibration procedures which may shortly after be stopped before completed may be avoided.

Step 2, designated the reference numeral 102, in the calibration procedure may comprise clearing the cyclic buffer.

Step 3, designated the reference numeral 103, in the calibration procedure may comprise setting the exposure settings of the second camera so essentially no areas in the recorded images of the second camera are overexposed. The second camera may comprise an automatic exposure control, which may receive an exposure point of interest as input and automatically set the exposure settings of the second camera so the exposure point of interest is well exposed, where the exposure point of interest may be a coordinate set spatially corresponding to points in images captured by the second camera, a method well known in the art. A process comprising storing the exposure settings of the second camera in a first exposure storage ExpBefore and recording an exposure calibration image and setting an exposure point of interest essentially to a centre of an area having a brightness equal to the brightness of a brightest areas in the exposure calibration image and then storing the automatically adjusted exposure settings of the second camera in a second exposure storage ExpAfter may be repeated until ExpAfter is essentially equal to ExpBefore. Hence, since for example two different areas in the surroundings in front of the second camera may have different brightness and still may both be overexposed and therefore may both result in a recorded maximum brightness, repeating the process will ensure, that the exposure point of interest is actually set to the essentially brightest area in the surroundings, and hereby overexposed areas may essentially be avoided. As it shall be seen below, avoiding overexposed images in the cyclic buffer may be an advantage in the further processing of the calibration procedure.

Step 4, designated the reference numeral 104, in the calibration procedure may comprise recording an image with the second camera and storing it in a current entry of the cyclic image buffer together with a time stamp and exposure settings data.

Step 5, designated the reference numeral 105, in the calibration procedure may comprise a calculation of the status variable VIDstatus, which may be set to either not inserted, under insertion, fully inserted or undecided, depending on a detected status of the visual instruction device. The calculation may comprise the use of a motion detector, which is well known in the art of image processing, where the motion detector may take an image stored in the current entry as input and output a motion estimation number between 0 and 100. As described above, the second parallel process may ensure that the calibration procedure is only completed when the second camera has been held fairly steady throughout it and the specialist may be instructed to position himself during the calibration procedure so there are essentially no big moving objects in front of the second camera except the visual instruction device, hence, essentially any motion detected may indicate that the visual instruction device is being moved in front of the second camera. The fifth step may comprise determining if the motion estimation number is above a motion threshold. The motion detection threshold may be 10 or it may be determined by observing the output value from the motion detector and recording a first output value being the highest observed value when the visual instruction device is moved in front of the second camera and observing the output value from the motion detector and recording a second output value being the highest observed value when the visual instruction device is not in front of the second camera and then calculating a first mean output value of the first output value and the second output value. Alternatively, this may be repeated a number of times, for example ten times, and a second mean output value may be calculated as a mean of the first output value.

The motion estimator may comprise a calculation which takes as input, besides the image stored in the current entry, also images stored in previous entries in the cyclic image buffer and hence require that a minimum number of images are stored in the cyclic image buffer. The minimum number of images may be 3. If the minimum number of images in the cyclic image buffer is not stored, the motion detector may not be able to output a motion estimation number and in this case the status variable VIDstatus may be set to undecided.

If the motion estimation number is smaller than the motion detection threshold the status variable VIDstatus of the current entry may be set to not inserted.

If the motion estimation number is bigger than the motion detection threshold and the status variable VIDstatus of a minimum number of entries in the cyclic image buffer which have a time stamp less than the time stamp stored in the current entry subtracted a first time interval and have a value equal to under insertion or fully inserted, the status variable VIDstatus of the current entry may be set to fully inserted. The minimum number may be half or a quarter of the number of entries having a time stamp less than the time stamp stores in the current entry subtracted the first time interval. The first time interval may for example be one second. Hence, if more than half of the recorded images for more than one second has had a motion estimation number higher than the motion detection threshold, it may be assumed that the visual instruction device has been fully inserted and the status variable VIDstatus of the current entry may be set to fully inserted. Alternatively, the status variable VIDstatus may be set to fully inserted if an entry exists in the cyclic buffer with a VIDstatus having a value equal to under insertion and a time stamp older than for example one second relative to the time stamp stored in the current entry.

If the motion estimation number is bigger than the motion detection threshold and there exists at least a minimum number of entries in the cyclic image buffer, which has a time stamp less than the time stamp stored in the current entry subtracted the time interval and which has a status variable VIDstatus of a value equal to not inserted or equal to undecided then the status variable VIDstatus of the current entry may be set to under insertion. Alternatively, the status variable VIDstatus may be set to under insertion if a difference image between a blur filtered version of an image stored in the current entry and a blur filtered version of an image having in an entry a time stamp for example minimum one second older than a time stamp in the current entry has an area with a brightness above a difference detection brightness threshold, the status variable VIDstatus may be set to fully inserted, where the difference detection brightness threshold may be 25% of maximum brightness.

Step 6, designated the reference numeral 106 in the calibration procedure, may comprise storing the image, the time stamp, exposure setting and VIDstatus in the cyclic image buffer.

Step 7, designated the reference numeral 107, in the calibration procedure may comprise determining if the status variable VIDstatus of the current entry has a value equal to undecided. If this is the case, more images may need to be captured and stored before a valid value of the motion estimation number may be output from the motion estimator and therefore, the calibration procedure may branch back to step 3, hence setting the exposure and capturing the next image. If this is not the case, and a valid value of the motion estimation number may be present, the calibration procedure may continue to step 7.

Step 8, designated the reference numeral 108, in the calibration procedure may comprise determining if the visual instruction device has been fully inserted, which may comprise determining if the status variable VIDstatus of the current entry has a value equal to fully inserted. If this is not the case the calibration procedure may branch back to step 3, hence setting the exposure and capturing the next image. If the status variable VIDstatus of the current entry has a value equal to fully inserted, the calibration procedure may continue to step 8.

Step 9, designated the reference numeral 109, in the calibration procedure may comprise adjusting the exposure to get a well exposed image of the visual instruction device. The automatic exposure control may be able to set the exposure settings according to an average brightness of the surroundings in front of the second camera, hence set exposure settings may be set according to the average brightness. It may be necessary to wait for the exposure settings to adjust before continuing to step 9, depending on the characteristics of the second camera.

Step 10, designated the reference numeral 110, in the calibration procedure may comprise recording an image with the second camera and storing it in the current entry of the cyclic image buffer together with a time stamp and exposure settings data and further copying it to the second reference image Ref2.

Step 11, designated the reference numeral 111, in the calibration procedure may comprise searching in the cyclic image buffer for a search entry, where the time stamp of the search entry is younger than 2 seconds relative to the time stamp in the current entry and the status variable VIDstatus in the search entry has a value equal to not inserted.

Step 12, designated the reference numeral 112, in the calibration procedure may comprise determining if an image was found in the search in step 11. If no image was found, an error message is displayed to the specialist in step 13, designated the reference numeral 113, with a text which may for example be equal to "If you tried pointing, then please press OK and try again while keeping the phone steady" and may further comprise branching back to step 2 after the specialist has provided a user activation, which may comprise pressing a virtual button on a touch screen, hence the buffer may be cleared and the calibration procedure started over from step 2.

Step 14, designated the reference numeral 114, in the calibration procedure may comprise digitally correcting the stored image in the search entry to essentially match the exposure of the second reference image Ref2 by setting a first exposure variable Eis to the exposure settings data in the search entry and setting a second exposure variable Eshould to the exposure settings data in the current entry. Hence, Eis may be the exposure settings with which the stored image in the search entry was recorded with and Eshould is the exposure settings is should essentially match. Eis and Eshould may then be used to select from a set of color corrections a color correction and may perform the color correction on the image stored in the search entry. The set of color corrections may be calibrated to match the second camera. Alternatively or additionally an interpolation between two color corrections may be performed, if an exactly matching color correction has not been calibrated.

Step 15, designated the reference numeral 115, of the calibration procedure may comprise the first reference image Ref1 being set equal to the image stored in the search entry after the color correction has been performed. Hence, the first reference image Ref1 may essentially appear as if it were taken with the same exposure settings as the second reference image Ref2.

Alternatively, the calibration procedure may comprise capturing a set of different exposures of candidates for Ref1 and then selecting one that matches the exposure of Ref2. The advantage of this is that noise in dark tones amplified by the color correction by the color correction may be avoided, but the disadvantage is that it requires the second camera to be able to adjust it's exposure settings to relevant different exposures and that it is able to do so relatively quickly to allow a fast calibration procedure. Alternatively, a combination of the different approaches may be used comprising a limited set of different exposures and a set of color corrections and/or interpolation between color corrections.

The calibration procedure may further, in step 16, designated the reference numeral 116, comprise calculating a first lookup table LUT1 comprising, for every possible input color C, a first output color LUT1(C) and where the first output color LUT1(C) may be calculated by a calculation setting LUT1(C) to a value representing the frequency of the color in the first reference image REF1 where the calculation may comprise counting the number of pixels in Ref1 having a color equal to C and which may further comprise setting at least one color channel and for example every color channel of LUT1(C) to the number of pixels in Ref1 divided by the total number of pixels in REF1 and multiplied by the maximum possible value of the color channel and similarly calculating a second lookup table LUT2 comprising, for every possible input color C, a second output color LUT2(C) and where the second output color LUT2(C) may similarly be calculated by counting the number of pixels in Ref2 having a color equal to C. Hence, LUT2 may comprise an estimate of the frequency of each color in a captured image by the second camera of the background with the visual instruction device in the foreground and LUT1 may be an estimate of the frequency of each color in the background behind the visual instruction device. Further, the calibration may comprise calculating a third lookup table LUT3 comprising, for every possible input color C, a third output color LUT3(C) and where the third output color LUT3(C) may be calculated by, for every possible color C by calculating at least one output color channel value in LUT3(C), and for example every out color channel in LUT3(C), as LUT3(C)=(LUT2(C)−LUT1(C))/LUT2(C). Hence, LUT3 (C) may be a gray tone having a brightness value which may represent an estimate of the probability of a pixel in an image recorded by the second camera and having the color C being in an area corresponding to the visual instruction device, so that when the brightness value is low, C it is not very probable that the pixel is in an area corresponding to the visual instruction device and when the brightness value is high it is highly probable that the pixel is in an area corresponding to the visual instruction device. Additionally to counting the number of pixels in the reference images, a scaling or thresholding of the number may be comprised, hence the lookup tables may for example have 8 bit color channel value storages. Additionally, REF2 may be cropped for example at the left side by an amount of pixels equal to 10% of the width of REF2 and at the right side by an amount of pixels equal to 10% of the width of REF2 and at the top by an amount of pixels equal to 10% of the height of REF2 and at the bottom by an amount of pixels equal to 10% of the height of REF2, hence areas which may have been introduced at the sides or top or bottom of REF2 by said second camera having moved between the recording of REF1 and REF2 may be eliminated from REF2 and thereby the precision of the estimated probabilities in REF3 may be increased.

Further, a dilate type operation may be performed on LUT1 before LUT3 is calculated, where the dilate type operation for every possible color C may assign the brightest color found in a set of pixel values comprising LUT1(C') for every color C' within a neighbourhood of C, where C' may be considered within a neighbourhood of C if for all color planes, the difference between a color plane value of C and the corresponding color plane value of C' is within a threshold radius Rd, which may be 2/1280 times the width of Ref1. Further, a similar dilate type operation may be performed on LUT2 before LUT3 is calculated. Alternatively, a similar dilate type operation may be performed on LUT3 after LUT3 has been calculated.

The advantage of these dilate type operations is that they may introduce a tolerance for smaller variations in colors of the same objects in recordings by the second camera after the reference images were recorded relative to when the reference images were recorded for example due to camera noise and variations in lighting and exposure, since the dilate type operations ensures that, even if a color of a specific object has changed slightly after the reference images were recorded, a lookup in a lookup table will not return a gray color of a lower brightness than that of the original color.

Alternatively, the determination of whether to consider C' within a neighbourhood of C may comprise converting the pixels values to and YUV color space and use different thresholds for each of the differences in color plane values. For example, the threshold for the Y color plane may be higher than the threshold for the U and V color planes, resulting in a bigger tolerance to shifts in brightness than to shifts in hue and saturation. This may be advantageous in some situations, where shifts in brightness may be expected to be bigger than shifts in hue and saturation, for example when full control over the exposure time and/or ccd sensitivity of the second camera is not attainable or when a shadow is cast over parts of the background or over the visual instruction device or a part of this.

After the calibration procedure, i.e. steps 1-16, has been performed, the mask calculation procedure, step 18, designated the reference numeral 118, may be performed essentially each time a captured image I is recorded. In step 17 designated the reference numeral 117, by the second camera of the visual instruction device in front of the background, where the first mask image M may be calculated from I by a calculation which may comprise applying the third lookup table LUT3 to I, M=LUT3(I), meaning that for every pixel I.P in the captured image I, the color of the pixel I.P is looked up in LUT3 and the value found is assigned to the spatially corresponding pixel M.P in M so that M.P=LUT3(C).

Accordingly, the image I captured in step 17, this image I being an image of the second video stream, is in step 19 designated the reference numeral 119, subjected to foreground/background segmentation and background replacement using the mask image M obtained by the mask calculation procedure in step 118 and using a received image, the received image being an image of the first video stream.

The steps 17-18-19 are then repeated.

Figure 12A:
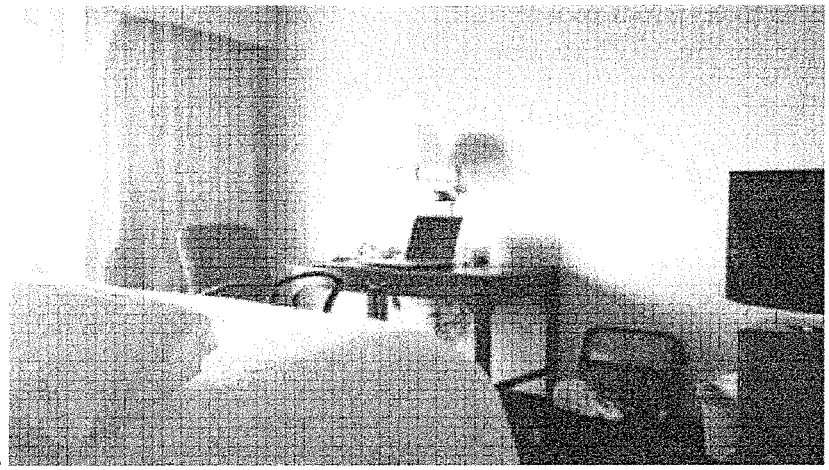
FIG. 12 A-C show an example of the first reference image Ref1, the second reference image Ref2 and the first mask image M, FIG. 13 A-B show an example of the second mask image Ms and the third mask image Mr, FIG. 14 A-C show an example of the third mask image Mr, the edge image Iedge and the fill image Ifill, where Ifill has been calculated by subtracting Iedge from Mr, FIG. 15 A-C show an example of the seed image Iseed, the fill image Ifill and the mask M, FIG. 16 A-C shows an example of the mask image M before and after the blur filter and thresholding has been applied.
Figure 12B:
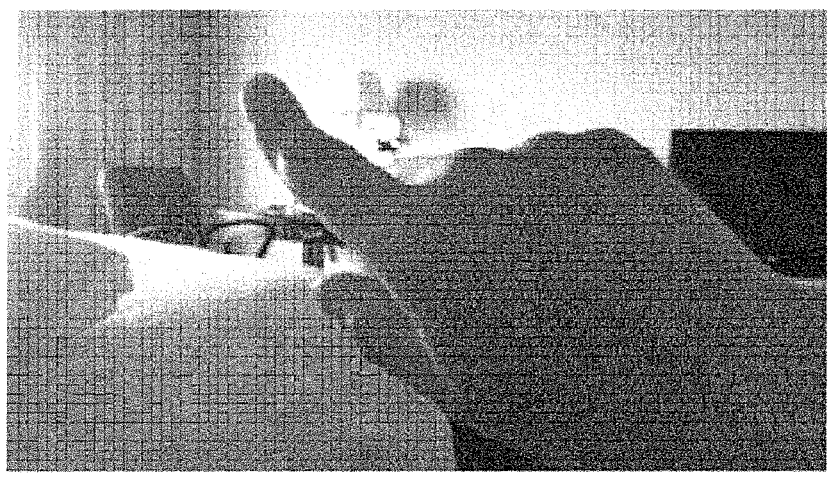
Figure 12C:
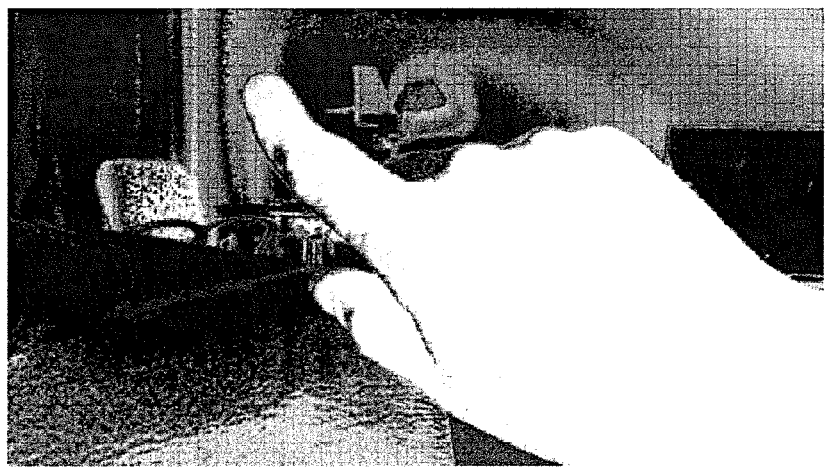

FIG. 12 A-C show an example of the first reference image Ref1, the second reference image Ref2 and the first mask image M.

The calculation of the first mask image M may further comprise a binarisation of M comprising a first color value thresholding of M and storing the result in M where the first color value thresholding uses a first threshold color value, which may be a gray color having a brightness equal to a first brightness threshold value Tm, where Tm may be 75% of maximum brightness and where pixels in M with a higher brightness than the first threshold color value may be set to a masking color. Hence, M may after the thresholding be for example a black and white binary mask. Alternatively, the first color value thresholding may be performed on color values in LUT3 and the result stored in LUT3.

Additionally, a noise filter F may be applied to M, where F may comprise a median filter having a radius Rm, where Rm may be equal to 1/100 times the width of the captured image I, where the median filter F may remove small clusters of white in areas corresponding to the background and small clusters of black in areas corresponding to the visual instruction device. Alternatively to a median filter, in configurations where the binarisation is comprised, F may comprise a blur filter and a thresholding, which may produce essentially the same result and which may be faster to execute in a graphics processor in a mobile phone. Alternatively, F may be a filter optimized to eliminate shapes differing from the visual instruction device.

Alternatively or additionally, an adaptive filter may be comprised, where the adaptive filter determines if a color C in a pixel P in the captured image I is new, meaning that it did not occur in either REF1 or REF2, which may be calculated by testing if (REF1(C)>Tc1) and (REF2(C)>Tc2) where Tc1 and Tc2 may be zero. If C is a new color it may mean that the estimate of the probability stored in P has a low confidence level and therefore a better estimate of the probability of P(C) may be calculated using information from I. The better estimate may be calculated in a calculation comprising calculating an average of the estimated probabilities in a neighbourhood to P. Alternatively or additionally, the calculation of the better estimate may comprise detecting if P is near the edge of the image, since a new color close to an edge of the image may have a higher probability of being introduced by a movement of the camera so new areas of the background are captured and hence have a higher probability of being characteristic for areas in the background. Further, the better estimate may be calculated based on the probabilities stored in C to a nearby pixel P' having a an affinity to P smaller than a threshold, where said affinity may be a homogeneity affinity, a connectedness affinity or a gradient affinity or another type of affinity calculation known in the art. The better estimate may further be stored in P(C), hence P may be updated after the calibration is completed and during the remote session. This may be an advantage if for example the visual instruction device is slowly being rotated, thereby introducing new colors previously hidden on the background, where the new colors may be in pixels having a high affinity to other pixels corresponding to the visual instruction device and updating P with the better estimate may increase the masking of the visual instruction device, which may even be true if the visual device is rotated slowly to uncover larger areas of "new" color, since these better estimates for these color may be calculated and P updated for each image captured during the slow rotation. Additionally or alternatively, the adaptive filter may take input from a motion detection and/or a position tracking device which may be embedded in a mobile phone and P(C) may be assigned a low probability if the mobile phone was moved during capture of I and a lower probability of the phone was essentially held still during capture of I.

Alternatively or additionally, P may be updated by for each color C counting the number of pixels in I having the color C and where the spatially corresponding pixel in M has the mask color and if this number is higher than the current number in REF2(C) then setting REF2(C) to this number and by for each color C counting the number of pixels in I having the color C and where the spatially corresponding pixel in M does not have the mask color and if this number is higher than the current number in REF1(C) then setting REF1(C) to this number and then P may be calculated as described above. Hence, the lookup tables may be updated by examining the area inside and the area outside the masked area and counting the occurrence of colors and updating the lookup tables with the highest occurrence. The advantage is, that new colors which may be included in M by the spatial noise filtering will then be added as colors with high probability of being in areas corresponding to said visual instruction device.

A moving mask video stream may be calculated by combining a series of masks, where each may be calculated in the same way as described for the first mask image M, into a moving mask video stream. The third video stream may then be calculated by compositing the first videostream and the second videostream using the moving mask video stream as a video keying mask, hence the background behind the visual instruction device in the second videostream is replaced by the background in the first videostream, and hence, the visual instruction device appears overlaid over the scene comprising the object of interest so the expert may point to features in the object of interest.

Alternatively to comprising the first color value thresholding of the first mask image M and storing the result in M, the calibration process may comprise a calculation of a second mask image Ms where Ms is calculated by performing a second color value thresholding of M using a second color value threshold, which may be a gray color having a brightness equal to a second brightness threshold value Ts and storing the result of the second color value thresholding in Ms and further comprising a calculation of a third mask image Mr where Mr is calculated by performing a third color value thresholding of M using a third color value threshold which may be a gray color having a brightness equal to a third brightness threshold value Tr and storing the result of the second color value thresholding in Mr. Hence Ms may perform a stricter masking than Mr, masking only some of the areas corresponding to the visual instruction device, but may have the benefit of masking essentially no areas corresponding to the background, whereas Mr may perform a more relaxed masking, masking all or most areas corresponding to the visual instruction device, but may also mask some areas corresponding to the background. Tr may be 1% of maximum brightness and Ts may be 95% of maximum brightness.

Alternatively Ts may be calculated by adjusting a fourth brightness threshold value Ts,min to a value between 0 and maximum brightness and calculating a first test mask image Mt(Ts,min) essentially every time Ts,min is adjusted to a new value, where Mt(Ts,min) may be calculated in essentially the same way as the second mask image Ms is calculated, except that the captured image I in the description above is substituted with the first reference image Ref1 and the second brightness threshold value Ts in the description above is substituted with Ts,min. The first test mask image Mt(Ts,min) may be continuously observed while Ts,min is being adjusted and Ts,min may be adjusted to a value where there are essentially no areas of the masking color observed in Mt(Ts,min). Alternatively, Ts,min may be adjusted automatically by setting Ts,min first to a value equal to maximum brightness and then repeating a process comprising decrementing Ts,min and counting a number Nt(Ts,min) of pixels in Mt(Ts,min) having a color equal to the masking color until Nt(Ts,min) becomes lower than a first pixel count threshold which may be 1. Hence Ts,min is essentially the lowest value Ts can be set to without resulting in colors in Ref1 being masked, and is therefore a good estimate of the lowest value Ts can be set to without resulting in colors being masked in areas of the captured image I corresponding to the background.

Ts may then be calculated as a value between Ts,min and maximum brightness, for example as the average of Ts,min and maximum brightness.

Alternatively, a fin brightness threshold value Ts,max may be adjusted to a value between 0 and maximum brightness and a second test mask image Mt'(Ts,max) may be calculated essentially every time Ts,max is adjusted to a new value, where Mt'(Ts,max) may be calculated in essentially the same way as the second mask image Ms is calculated, except that the captured image I in the description above is substituted with the second reference image Ref2 and the second brightness threshold value Ts in the description above is substituted with Ts,max and further the noise filter F may be omitted in calculating Mt'(Ts,max). The second test mask image Mt'(Ts,max) may be continuously observed while Ts,max is being adjusted and Ts,max may be adjusted to a value where there are a minimum of pixels of the masking color observed in Mt(Ts,max), for example so the minimum of pixels is approximately 0.1% of the total number of pixels in Ref2. Alternatively, Ts,max may be adjusted automatically by setting Ts,max first to a value equal to minimum brightness and then repeating a process comprising incrementing Ts,max and counting a number Nt'(Ts,max) of pixels in Mt'(Ts,max) having a color equal to the masking color until Nt'(Ts,max) becomes higher than a second pixel count threshold which may be equal to 0.1% of the number of pixels in Ref2. Hence Ts,max is the highest value Ts can be set to without resulting in less than 0.1% of the pixels in Ref2 being masked, and is therefore a good estimate of the highest value Ts can be set to without resulting in less than an adequate number of pixels being masked in areas of the captured image I corresponding to the visual instruction device. Ts may then be calculated as a value between Ts,min and Ts,max, for example as the average of Ts,min and Ts,max. If Ts,max−Ts,min is smaller than a minimum difference Tdiff, a message may be displayed to the user to try to find a background having less similarity with the visual instruction device and the calibration may be repeated with a new background. Tdiff may be $1/10$ times maximum brightness.

Figure 13A:
Figure 13B:
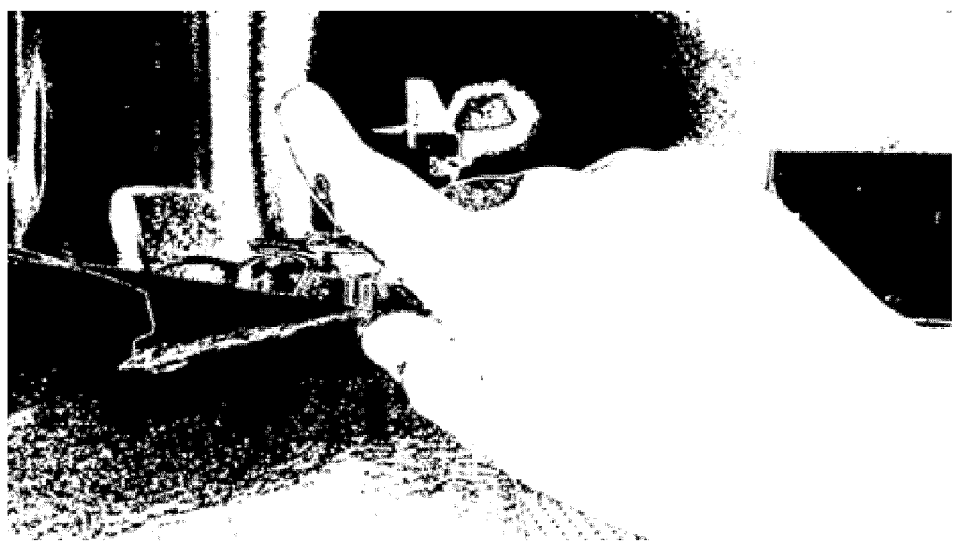

FIG. 13 A-B show an example of the second mask image Ms and the third mask image Mr.

A seed image Iseed may be calculated by setting it equal to the second mask image Ms and a fill image Ifill may be calculated by setting it equal to the third mask image Mr. Alternatively, the fill image Ifill may be calculated by subtracting an edge image Iedge from the third mask image Mr, where the edge image Iedge may be an image comprising pixels having a color equal to the mask color in areas close to edges in the captured image I and may be calculated using an edge detection filter, which is well known in the art of image processing and which may be a threshold edge detection filter with a radius of $2/1000$ times the width of the captured image I or may be a Sobel edge detection filter, a Prewitt edge detection filter or a Canny edge detection filter. Additionally or alternatively, the edge image Iedge may comprise pixels having a color equal to the mask color in areas close to edges in the first mask image M. Additionally, the seed image may be noise filtered for example with a median filter having a radius equal to 0.5% of the seed image.

Figure 14A:
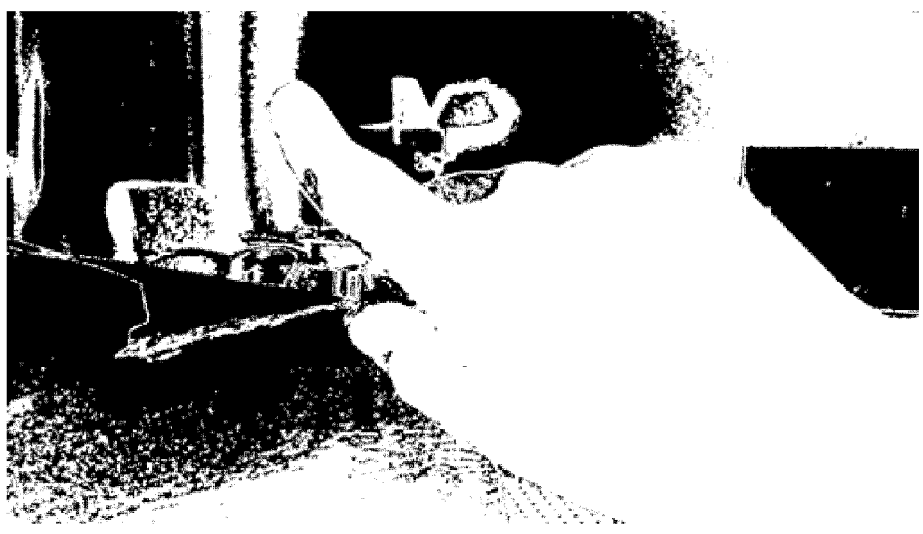
Figure 14B:
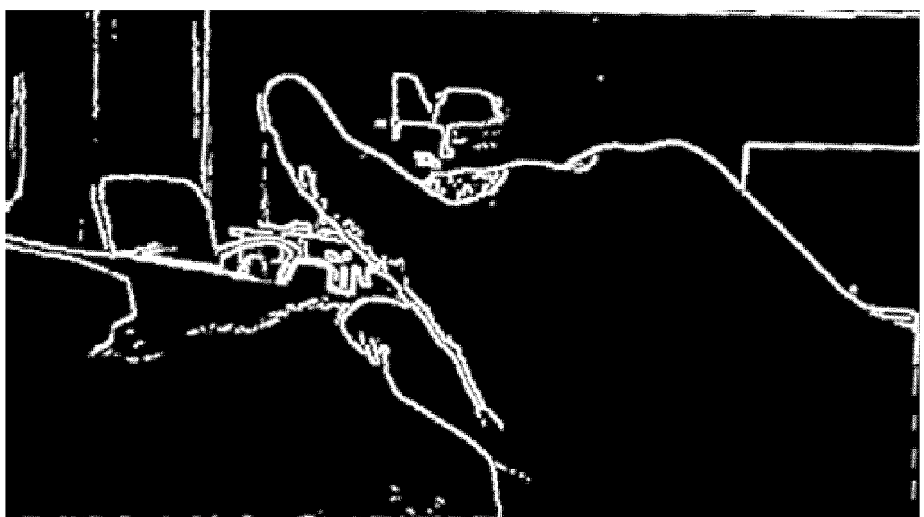
Figure 14C:

FIG. 14 A-C show an example of the third mask image Mr, the edge image Iedge and the fill image Ifill, where Ifill has been calculated by subtracting Iedge from Mr.

The first mask image M may be calculated by a seed fill operation, well known in the art of image processing, by using Ifill as the image to be filled and points in Ifill corresponding to point in Iseed having a pixel color value equal to the masking color as seed points. Additionally, a dilation filter may be applied to the seed image and the mask image M may be multiplied with the seed image after the seed fill operation, where the radius of the dilation filter may be 1/20 times the width of the captured image I, hence constraining the seed fill operation to fill areas within a radius of 1/20 times the width of the captured image I from any point in Iseed having a pixel color value equal to the masking color.

Alternatively, the first mask image M may be calculated by a process which may comprise setting M equal to Iseed and then performing a constrained dilation process where the constrained dilation process may comprise a dilation of M with a radius Rd, and may further comprise calculation of the edge image Iedge with an edge radius of the edge detection filter set to Rd whereby the with of edge lines may be equal to 2*Rd, and may further comprise a calculation of the fill image Ifill by setting Ifill=Mr−Iedge, and may further comprise a multiplication of M with Ifill and may further comprise setting M equal to the result of the multiplication and may further comprise adding Iseed to M. The constrained dilation process may be repeated a number of times, in the following referred to as passes, for example 7 times, where the value of Rd may be different for the passes, for example M may be calculated by comprising seven passes of the constrained dilation process using the values 0.8%, 0.8%, 0.8%, 0.4%, 0.15%, 0.15% and 0.0% of the width of the captured image for Rd.

Figure 15A:
Figure 15B:
Figure 15C:

FIG. 15 A-C show an example of the seed image Iseed, the fill image Ifill and the mask M.

Additionally, a blur filter with a radius Rm may be applied to the first mask image M and a color value thresholding using a color value threshold which may be a gray color having a brightness equal to 1/3 of maximum brightness may be applied to M, where Rm may be 10 or may be 30. This may smooth the contours in M thereby reducing jagged edges on the visual instruction device in the third video stream.

Figure 16A:
Figure 16B:
Figure 16C:
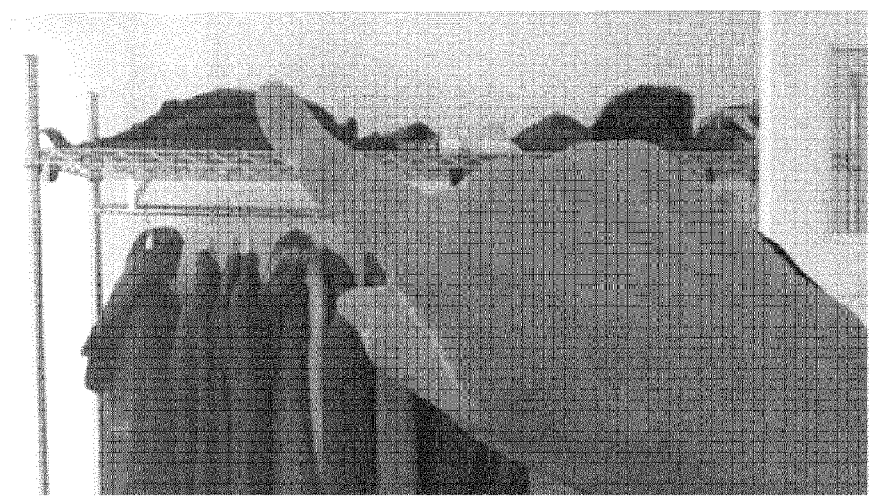

FIG. 16 A-C shows an example of the mask image M before and after the blur filter and thresholding has been applied.

Alternatively or additionally to using colors for identifying the visual instruction device, other image characteristics may be used including but not limited to shapes, spatial frequencies and spatial frequencies of specific colors. For example, the reference images and the captured image I may be high frequency filtered before processed as described above, thereby identifying the visual instruction device by spatial frequencies or the mask images may be high frequency filtered, thereby identifying patterns of high frequency of specific colors in the captured image. Alternatively to storing color values, the lookup tables may store integer number of pixel occurrences.

Additionally, a tracking of the position of the visual instruction device or a part of the visual instruction device may be performed and may comprise a position calculation of a least one pixel position in the first mask image M. The part of the visual instruction device may be a fingertip and the position calculation may comprise determining a position of a pixel in the first mask image having a color equal to the masking color and where the position has a higher location in the first mask image than essentially every other pixel in the first mask image having a color equal to the masking color. Additionally, an activation detection of an activation request by the specialist may be comprised, where the activation detection may comprise a characteristic movement detection of a movement having a first movement characteristic of the part of the visual instruction device may be detected. Such characteristic movement detection is well known in the art. For example, the first movement characteristic may comprise detecting a rapid up and down movement which may comprise a detection of a first change in the position in in the downwards direction, i.e. towards the lower edge of M and of a second change in the position in the upwards direction where it further may be detected if the first change in position and the second change in position occurs within a given period of time which may be one second. The activation detection may trigger an action where the action may be selected depending on the position of the part of the visual instruction device. The action may for example comprise enlarging an area surrounding the position of the part of the visual instruction device.

Hence, the specialist may be able to point to a feature and by quickly tipping his fingertip he may zoom into that feature so it is enlarged and both the specialist and the user can examine it in greater detail.

Alternatively or additionally, the action may comprise storing a still image or a sequence from the third video stream. Alternatively or additionally, at least one virtual button may be comprised for example overlaid on the third video stream and the action may be selected depending on a determination of if the position is essentially within an area covered by the virtual button. Alternatively or additionally, the position may be transmitted from the first mobile device to the object of interest. For example, the object of interest may be a computer interface and the position may be transmitted to the computer interface where it may for example control the position of a cursor. Alternatively or additionally, a hand gesture detection on the first make image M may be performed and an output of the hand gesture detection may be transmitted to the object of interest or may be transferred to an operating system or an application of the second or the first mobile device.

Figure 17:
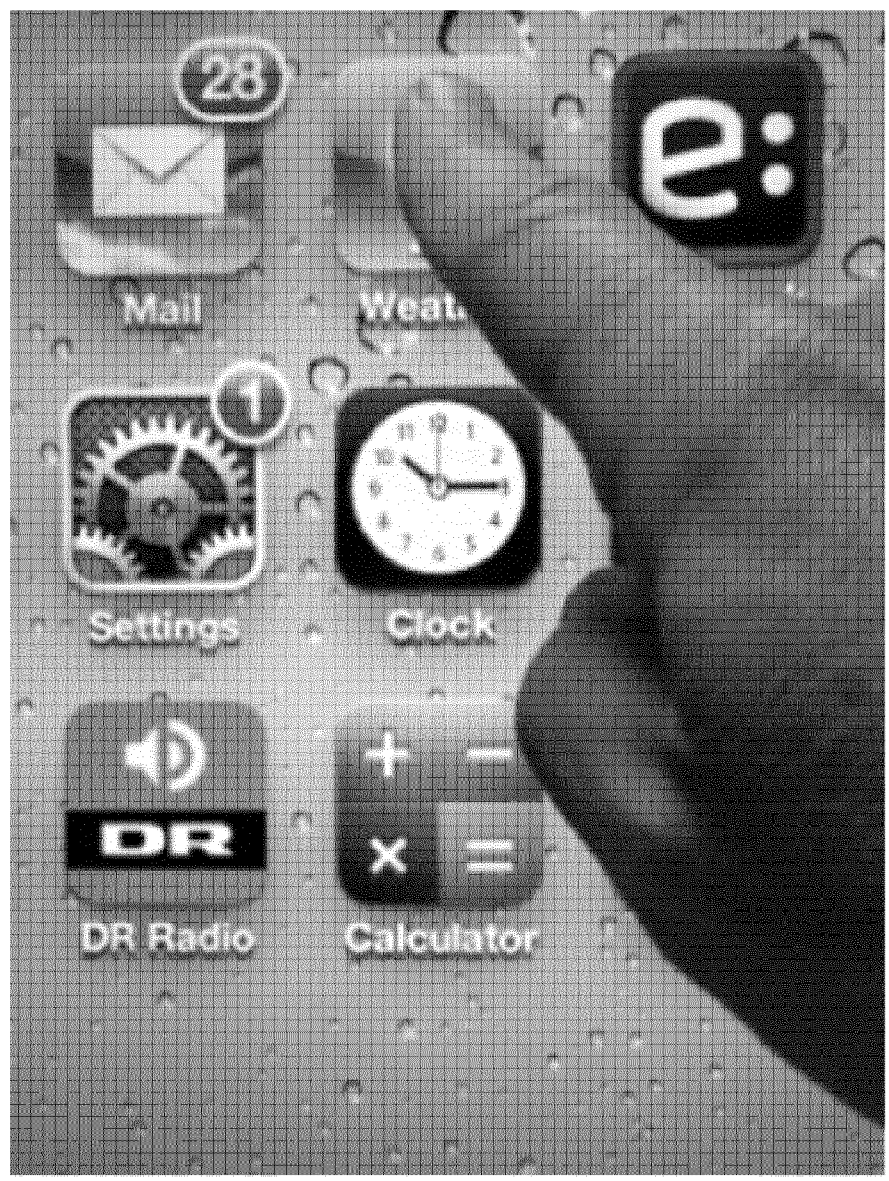
FIG. 17 shows an alternative configuration where the position may be transferred to an operating system or an application.

FIG. 17 shows an alternative configuration of the present invention where the position may be transferred to an operating system or an application and where the output of the gesture detection or activation detection may be transferred to an operating system or an application where the operating and the application may be comprised in the second mobile device and the first mask image M may be used to key an image recorded by the second camera over a user interface image of the operating system or of the application. This may be used as an alternative to a touch sensitive display for example in conjunction with a head mounted display. In other words, additionally or alternatively to being used for keying the third video stream for remote assistance, the first mask image M may be used as part of a gesture detection and/or hand tracking system as a pre-processing of an image captured by the second camera making the gesture detection and/or hand tracking simpler and more robust. Gesture detection and hand tracking systems are well known in the art of image processing.

Points Characterising the Invention

1. A method of providing a digitally represented visual instruction from a specialist operating a visual instruction device to a user in need of said visual instruction in relation to an object of interest, the method comprising the steps of:
   i. providing a first mobile device associated with said user, said first mobile device comprising:
      a. a first camera,
   ii. providing a second mobile device associated with said specialist, said second mobile device comprising:
      b. a second camera,
      c. a second display,
   iii. positioning said first mobile device such that said first camera is directed towards a first scene comprising said object of interest,
   iv. capturing a first video stream of said first scene by said first camera,
   v. positioning said second mobile device such that said second camera is directed towards a second scene comprising said visual instruction device and such that said second display is viewable by said specialist,
   vi. capturing a second video stream of said second scene by said second camera, said second video stream comprising a digital representation of said visual instruction device, said digital representation of said visual instruction device defining said digitally represented visual instruction.
   vii. generating a third video stream comprising said digitally represented visual instruction in the foreground and said first video stream in the background,
   viii. displaying said third video stream on said second display, such that said specialist may view said third video stream and in response to said third video stream and in order to generate said digitally represented visual instruction, operate said visual instruction device in relation to said object of interest.
   ix. sending said digitally represented visual instruction to said first mobile device and receiving said digitally represented visual instruction by said first mobile device, and,
   x. displaying said digitally represented visual instruction to said user.

2. The method according to point 1 further comprising the steps of:
   xi. sending said first video stream to said second mobile device and receiving said first video stream by said second mobile device, and
   xii. generating said third video stream by said second mobile device.

3. The method according to point 1, further comprising the steps of
   xiii. providing a server capable of generating said third video stream,
   xiv. sending said first video stream and said digitally represented visual instruction to said server and receiving said first video stream and said digitally represented visual instruction by said server,
   xv. generating said third video stream by said server, and
   xvi. sending said third video stream to said second mobile device and receiving said third video steam by said second mobile device.

4. The method according to any preceding point wherein said first mobile device further comprises:
   d. a first display,
   and said positioning of said first mobile device further being such that said first display is viewable by said user, and said digitally represented visual instruction is displayed on said first display 5. The method according to point 4, said first camera and said first display being provided on opposite sides of said first mobile device.

6. The method according to point 5, further comprising the step of:
   xvii. positioning said first mobile device such that said first display is provided on a visual axis between said object of interest and an eye of said user, or alternatively positioning said first mobile device such that said first camera and said first display are provided on a visual axis between said object of interest and the eyes of said user, 7. The method according to any of the points 4-6 further comprising the steps of:
   xviii. sending said third video stream to said first mobile device and receiving said third video stream by said first mobile device, and,
   xix. displaying said third video stream on said first display.

8. The method according to any of the points 4-6, further comprising the steps of:
   xx. generating a fourth video stream comprising said digitally represented visual instruction in the foreground and said first video stream in the background by said first mobile device, and,
   xxi. displaying said fourth video stream on said first display.

9. The method according to point 6, said first display being optically transparent, and said digitally represented visual instruction being displayed on a part of said first display, such that said user may see said digitally represented visual instruction on said part of said first display, and said object of interest optically through said first display, simultaneously.

10. The method according to any of the preceding points, wherein said first mobile device further comprises
    e. a first projection device,
    and wherein the method further comprises the step of:
    xxii. projecting said digitally represented visual instruction onto said object of interest.

11. The method according to any of the preceding points, said visual instruction device comprising the hand of the specialist and/or an object held by said hand.

12. The method according to any of the preceding points, said second camera and said second display being provided on opposite sides of said second mobile device.

13. The method according to point 12, further comprising the step of:
    xxiii. positioning said second mobile device such that said second display is provided on a visual axis between said visual instruction device and an eye of said specialist, or alternatively positioning said second mobile device such that said second camera and said second display are provided on a visual axis between said visual instruction device and the eyes of said specialist.

14. The method according to any preceding point, said first mobile device being a first headgear device, preferably a helmet or goggles, said first headgear device being affixable to the head of said user and being adapted to position said first display such that it is viewable by said user when said first headgear device is affixed to the head of said user.

15. The method according to any preceding point, said second mobile device being a second headgear device, preferably a helmet or goggles, said second headgear device being affixable to the head of said specialist and being adapted to position said second display such that it is viewable by said specialist when said second headgear device is affixed to the head of said specialist.

16. The method according to any of the points 1-13, further comprising the steps of:
   xxiv. providing a first headgear holding device, preferably a helmet, headband or goggles affixable to the head of said user, comprising a first holding device for holding said first mobile device and a first positioning device interposed between said first headgear holding device and said first holding device, said first positioning device being adapted to position said first mobile device such that said first display is viewable by said user when said first headgear holding device is affixed to the head of said user, and
   xxv. affixing said first headgear holding device to the head of said user and attaching said first mobile device to said first holding device, or alternatively or additionally the steps of:
   xxvi. providing a second headgear holding device, preferably a helmet, headband or goggles, affixable to the head of said specialist, comprising a second holding device for holding said second mobile device, and a second positioning device interposed between said second headgear holding device and said second holding device, said second positioning device being adapted to position said second mobile device such that said second display is viewable by said specialist when said second headgear holding device is affixed to the head of said specialist, and
   xxvii. affixing said second headgear holding device to the head of said specialist and attaching said second mobile device to said second holding device.

17. The method according to any of the preceding points, said generation of said third video stream being performed essentially simultaneously with said capturing of said first video stream and said capturing of said second video stream.

18. The method according to any preceding point, wherein said second mobile device further comprises:
   f. a light source for illuminating said visual instruction device, and the method further comprises the step of:
   xxviii. illuminating said visual instruction device by said light source.

19. The method according to any preceding point further comprising the steps of:
   xxix. performing a foreground/background segmentation on said second video stream by segmenting each video image of said second video stream into a foreground video image segment and a background video image segment such that said digitally represented visual instruction is comprised by said foreground video image segment, and,
   xxx. performing a background replacement on said second video stream with said first video stream by combining each foreground video image with a temporally corresponding video image from said first video stream.

20. The method according to any of the points 1-17, wherein said second mobile device further comprises:
   g. a light source for illuminating said visual instruction device, and step vii comprises the substeps of:
   h. recording a first frame of said second video stream by said second camera while said light source does not illuminate said visual instruction device,
   j. recording a second frame of said second video stream by said second camera while said light source illuminates said visual instruction device,
   k. generating a differential frame by subtracting said second frame transformed into grayscale from said first frame transformed into grayscale,
   m. optionally generating a filtered differential frame by noise filtering said differential frame, wherein said noise filtering may be median filtering,
   n. generating a foreground mask by threshold filtering said differential frame or said filtered differential frame or, and
   o. generating a frame of said third video stream by adding the product of said first frame and said foreground mask to the product of a frame of said first video stream and the inverse of said foreground mask.

21. A method of providing a digitally represented visual instruction from a specialist, operating a visual instruction device, to a user in need of said visual instruction in relation to an object of interest, the method comprising the steps of:
   xxxi. providing a first mobile device associated with said user, said first mobile device comprising:
   p. a first camera,
   xxxii. providing a projection device associated with said user and capable of projecting said digitally represented visual instruction,
   xxxiii. providing a second mobile device associated with said specialist, said second mobile device comprising:
   q. a second camera,
   r. a second screen,
   xxxiv. positioning said first mobile device such that said first camera is directed towards a first scene comprising said object of interest,
   xxxv. positioning said projection device such that said projection device is capable of projecting said digitally represented visual instruction onto said first scene,
   xxxvi. positioning said second mobile device such that said second camera is directed towards a second scene comprising said visual instruction device and such that said second screen is viewable by said specialist,
   xxxvii. capturing a first video stream of said first scene by said first camera,
   xxxviii. capturing a second video stream of said second scene by said second camera, said second video stream comprising a digital representation of said visual instruction device, said digital representation of said visual instruction device defining said digitally represented visual instruction.
   xxxix. providing a third video stream using said second video stream, said third video stream comprising said digitally represented visual instruction in the foreground on a dark or black background,
   xl. sending said third video stream to said projection device and receiving said third video stream by said projecting device,
   xli. projecting said third video stream onto said first scene, thereby providing said digitally represented visual instruction to said user, and thereby introducing said digitally represented visual instruction into said first scene,
   xlii. sending said first video stream to said second mobile device and receiving said first video stream by said second mobile device, xliii. displaying said first video stream on said second screen such that said specialist may view said first video stream, and in response to said first video stream, and in order to generate said digitally represented visual instruction, operate said visual instruction device in relation to said object of interest.

22. The method according to point 21, said projection device being comprised by said first mobile device.

23. The method according to any of the points 21-22, further comprising the steps of:
   xliv. analyzing said second video stream for determining whether:
      s. said second video stream comprises said digitally represented visual instruction on a uniform dark or black background, in which case said providing of said third video stream comprises copying said second video stream, or
      t. said second video stream does not comprise said digitally represented visual instruction on a uniform dark or black background, in which case said providing of said third video stream comprises the substeps of:
         i. performing a foreground/background segmentation on said second video stream by segmenting each video image of said second video stream into a foreground video image and a background video image such that said digitally represented visual instruction is comprised by said foreground video image, and,
         ii. performing a background replacement on said second video stream by combining each foreground video image with a dark or black background image.

24. A system for providing a digitally represented visual instruction from a specialist operating a visual instruction device to a user in need of said visual instruction in relation to an object of interest, the system comprising:
   a first mobile device comprising a first camera,
   a second mobile device comprising a second camera and a second display,
   said first camera being configured to capture a first video stream of a first scene comprising said object of interest,
   said second camera and the second display being provided on the second mobile device such that second camera can be directed towards a second scene comprising said visual instruction device while said second display is viewable by said specialist,
   said second camera being further configured to capture a second video stream of said second scene, said second video stream comprising a digital representation of said visual instruction device, said digital representation of said visual instruction device defining said digitally represented visual instruction,
   said second mobile being configured to generate a third video stream comprising said digitally represented visual instruction in the foreground and said first video stream in the background, and
   said second mobile device being configured to display said third video stream on said second display so that said specialist may view said third video stream, and in response to said third video stream, and in order to generate said digitally represented visual instruction, operate said visual instruction device in relation to said object of interest,
   said second mobile device further being configured to provide said digitally represented visual instruction to said first mobile device, and,
   said first mobile device being configured to display said digitally represented visual instruction to said user.

25. A system for providing a digitally represented visual instruction from a specialist operating a visual instruction device to a user in need of said visual instruction in relation to an object of interest, the system comprising:
   a first mobile device comprising a first camera,
   a projection device
   a second mobile device comprising a second camera and a second display,
   said first camera being configured to capture a first video stream of a first scene comprising said object of interest,
   said second camera and the second display being provided on the second mobile device such that second camera can be directed towards a second scene comprising said visual instruction device while said second display is viewable by said specialist,
   said second camera being further configured to capture a second video stream of said second scene, said second video stream comprising a digital representation of said visual instruction device, said digital representation of said visual instruction device defining said digitally represented visual instruction,
   said second mobile being configured to provide a third video stream, using said second video stream, said third video stream comprising said digitally represented visual instruction in the foreground on a dark or black background,
   said second mobile device being configured to send said third video stream to said projector,
   said projector being configured to receive said third video stream and to project said third video stream onto said object of interest in order to introduce said digitally represented visual instruction into said first scene.

LIST OF PARTS WITH REFERENCE TO THE FIGURES

2. Specialist
4. Hand
6. User
8. Control panel
10. System
12. First mobile device
14. First display
16. First video stream
18. Second mobile device
20. Second display
22. Arrow indicating sending the first video stream 16 from the first mobile device 12 to the second mobile device 18
24. Third video stream
26. Digitally represented visual instruction
28. Arrow indicating sending the third video stream 24 from the second mobile device 18 to the first mobile device 12
30. Server
32. Second video stream
34. Arrow indicating sending the second video stream 32 from the second mobile device 18 to the server 30
36. Projection
38. Glasses
40. First camera
42. Headband
44. Arm
46. Clamp
48. Lens
50. Vertical headband
52. Helmet -continued 54. Arm
56. Glasses
101-119. Method steps

The invention claimed is:

1. A method of providing a digitally represented visual instruction relating to an object of interest to a user from a specialist operating a visual instruction device, the visual instruction device comprising a hand of the specialist or an object held by the hand of the specialist, the method comprising the steps of:
   i. providing a first mobile device associated with the user, the first mobile device having first and second opposed sides and comprising a first camera on the first side of the first mobile device and a first display on the second side of the first mobile device;
   ii. providing a second mobile device associated with said specialist, the second mobile device having first and second opposed sides and comprising a second camera on the first side of the second mobile device and a second display on the second side of the second mobile device;
   iii. positioning the first mobile device such that the first camera is directed toward a first scene comprising the object of interest, such that the first display is viewable by the user, and the digitally represented visual instruction is displayed on the first display, such that the first display is provided on a first visual axis between the object of interest and an eye of the user;
   iv. capturing a first video stream of video images of the first scene by the first camera;
   v. positioning the second mobile device such that the second camera is directed toward a second scene comprising the visual instruction device and such that the second display is viewable by the specialist, such that the second display is provided on a second visual axis between the visual instruction device and an eye of the specialist;
   vi. capturing a second video stream of video images of the second scene by the second camera, the second video stream comprising a digital representation of the visual instruction device, the digital representation of the visual instruction device defining the digitally represented visual instruction;
   vii. generating a third video stream comprising a foreground including the digitally represented visual instruction and a background including the first video stream;
   viii. displaying the third video stream on the second display, such that the specialist may view the third video stream, and, in response to the third video stream and in order to generate the digitally represented visual instruction, operate the visual instruction device in relation to the object of interest;
   ix. sending the digitally represented visual instruction to the first mobile device and receiving the digitally represented visual instruction by the first mobile device; and
   x. displaying the digitally represented visual instruction to the user on the first display.

2. The method according to claim 1, further comprising the steps of:
   xi. sending the first video stream to the second mobile device and receiving the first video stream by the second mobile device; and
   xii. generating the third video stream by the second mobile device.

3. The method according to claim 2, further comprising the steps of:
   xiii. providing a server capable of generating the third video stream;
   xiv. sending the first video stream and the digitally represented visual instruction to the server, and receiving the first video stream and the digitally represented visual instruction by the server;
   xv. generating the third video stream by the server; and
   xvi. sending the third video stream to the second mobile device and receiving the third video stream by the second mobile device.

4. The method according to claim 1, further comprising the steps of:
   sending the third video stream to the first mobile device, and receiving the third video stream by the first mobile device; and
   displaying the third video stream on the first display.

5. The method according to claim 1, further comprising the steps of:
   generating a fourth video stream comprising the digitally represented visual instruction in the foreground and the first video stream in the background by the first mobile device; and
   displaying the fourth video stream on the first display.

6. The method according to claim 1, wherein the first display is optically transparent, and wherein the digitally represented visual instruction is displayed on a part of the first display, such that the digitally represented visual instruction is viewable by the user on the part of the first display, and the object of interest is simultaneously viewable by the user through the first display.

7. The method according to claim 1, wherein the first mobile device further comprises a first projection device, and wherein the method further comprises the step of projecting the digitally represented visual instruction onto the object of interest.

8. The method according to claim 1, wherein the step of generating the third video stream is performed essentially simultaneously with the step of capturing the first video stream and the step of capturing the second video stream.

9. The method according to claim 1, wherein the second mobile device further comprises a light source, the method further comprising the step of illuminating the visual instruction device by the light source.

10. The method according to claim 1, further comprising the steps of:
    performing a foreground/background segmentation on the second video stream by segmenting each video image of the second video stream into a foreground video image and a background video image, such that the digitally represented visual instruction includes the foreground video image; and
    performing a background replacement on the second video stream with the first video stream by combining each foreground video image with a temporally corresponding video image from the first video stream.

11. The method according to claim 1, wherein the step of positioning is performed such that the first camera and the first display are provided on the first visual axis between the object of interest and the eye of the user.

12. A method of providing a digitally represented visual instruction relating to an object of interest to a user from a specialist operating a visual instruction device comprising a hand of the specialist or an object held by the hand of the specialist, the method comprising the steps of:
  i. providing a first mobile device associated with the user, the first mobile device comprising a first camera and a projection device operable for projecting the digitally represented visual instruction;
  ii. providing a second mobile device associated with the specialist, the second mobile device having first and second opposed sides and comprising a second camera on the first side and a screen on the second side;
  iii. positioning the first mobile device such that the first camera is directed toward a first scene including the object of interest;
  iv. positioning the projection device such that the projection device is capable of projecting the digitally represented visual instruction onto the first scene;
  v. positioning the second mobile device such that the second camera is directed toward a second scene including the visual instruction device, and such that the screen is viewable by the specialist, such that the screen is provided on a visual axis between the visual instruction device and an eye of the specialist;
  vi. capturing a first video stream of video images of the first scene by the first camera;
  vii. capturing a second video stream of video images of the second scene by the second camera, the second video stream comprising a digital representation of the visual instruction device, the digital representation of the visual instruction device defining the digitally represented visual instruction;
  viii. providing a third video stream using the second video stream, the third video stream comprising the digitally represented visual instruction in a foreground on a dark background;
  ix. sending the third video stream to the projection device, and receiving the third video stream by the projection device;
  x. projecting the third video stream onto the first scene, thereby providing the digitally represented visual instruction to the user, and thereby introducing the digitally represented visual instruction into the first scene;
  xi. sending the first video stream to the second mobile device and receiving the first video stream by the second mobile device; and
  xii. displaying the first video stream on the screen such that the first video stream is viewable by the specialist, whereby, in response to the first video stream, and in order to generate the digitally represented visual instruction, the visual instruction device is operable by the specialist in relation to the object of interest.

13. The method according to claim 12, further comprising the step of analyzing the second video stream to determine whether (a) the second video stream includes the digitally represented visual instruction on a dark background, in which case the step providing of the third video stream comprises copying the second video stream, or (b) the second video stream does not include the digitally represented visual instruction on a dark background, in which case the step of providing of the third video stream comprises the substeps of:
  viii (a) performing a foreground/background segmentation on the second video stream by segmenting each video image of the second video stream into a foreground video image and a background video image, such that the digitally represented visual instruction includes the foreground video image; and viii (b) performing a background replacement on the second video stream by combining each foreground video image with a dark background image.

14. A system for providing a digitally represented visual instruction relating to an object of interest to a user from a specialist operating a visual instruction device comprising a hand of the specialist or an object held by the hand of the specialist, the system comprising:
  a first mobile device having first and second opposed sides and comprising a first camera on the first side of the first mobile device and a first display on the second side of the first mobile device, the first camera being configured to capture a first video stream of a first scene including the object of interest, the first display being viewable by the user and operable to display the digitally represented visual instruction; and
  a second mobile device having first and second opposed sides and comprising a second camera on the first side of the second mobile device and a second display on the second side of the second mobile device, wherein the second camera is configured to be directed toward a second scene including the visual instruction device while the display is viewable by the specialist, the second camera being further configured to capture a second video stream of the second scene, the second video stream including a digital representation of the visual instruction device that defines the digitally represented visual instruction;
  wherein the first display is provided on a first visual axis between the object of interest and an eye of the user;
  wherein the second display is provided on a second visual axis between the visual instruction device and an eye of the specialist;
  wherein the second mobile device is configured to generate a third video stream comprising a foreground including the digitally represented visual instruction, and a background including the first video stream;
  wherein the second mobile device is configured to display the third video stream on the second display so that the third video stream is viewable by the specialist, and so that, in response to the third video stream, and in order to generate the digitally represented visual instruction, the visual instruction device is operable by the specialist in relation to the object of interest;
  wherein the second mobile device is further configured to provide the digitally represented visual instruction to the first mobile device; and
  wherein the first mobile device is configured to display the digitally represented visual instruction to the user.

15. The system according to claim 14, wherein the first camera and the first display are provided on the visual axis between the object of interest and the eye of the user.

16. A system for providing a digitally represented visual instruction relating to an object of interest to a user from a specialist operating a visual instruction device comprising a hand of the specialist or an object held by the hand of the specialist, the system comprising:
  a first mobile device comprising a first camera configured to capture a first video stream of a first scene including the object of interest;
  a projection device;
  a second mobile device having first and second opposed sides and comprising a second camera on the first side and a display on the second side, wherein the second camera is configured to be directed toward a second scene including the visual instruction device while the display is viewable by the specialist, such that the display is provided on a visual axis between the visual instruction device and an eye of the specialist;

wherein the second camera is further configured to capture a second video stream of the second scene, the second video stream comprising a digital representation of the visual instruction device, the digital representation of the visual instruction device defining the digitally represented visual instruction;

wherein the second mobile device is configured to provide a third video stream using the second video stream, the third video stream comprising a foreground including the digitally represented visual instruction, and a dark background;

wherein the second mobile device is configured to send the third video stream to the projection device; and wherein the projection device is configured to receive the third video stream and to project the third video stream onto the object of interest in order to introduce the digitally represented visual instruction into the first scene.

17. The system according to claim 16, wherein the display and the second camera are provided on the visual axis between the visual instruction device and the eye of the specialist.

* * * * *